United States Patent
Bi et al.

(10) Patent No.: US 11,363,587 B2
(45) Date of Patent: Jun. 14, 2022

(54) INFORMATION TRANSMISSION METHOD AND DEVICE

(71) Applicant: ZTE CORPORATION, Guangdong (CN)

(72) Inventors: Feng Bi, Guangdong (CN); Xing Liu, Guangdong (CN); Peng Hao, Guangdong (CN); Haigang He, Guangdong (CN); Wenhao Liu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 34 days.

(21) Appl. No.: 16/965,133

(22) PCT Filed: Nov. 6, 2018

(86) PCT No.: PCT/CN2018/114195
§ 371 (c)(1),
(2) Date: Jul. 27, 2020

(87) PCT Pub. No.: WO2019/148920
PCT Pub. Date: Aug. 8, 2019

(65) Prior Publication Data
US 2021/0045098 A1  Feb. 11, 2021

(30) Foreign Application Priority Data

Jan. 31, 2018 (CN) .......................... 201810093991.0

(51) Int. Cl.
*H04W 72/04* (2009.01)
*H04W 68/02* (2009.01)
(Continued)

(52) U.S. Cl.
CPC ......... *H04W 72/042* (2013.01); *H04W 68/02* (2013.01)
(Continued)

(58) Field of Classification Search
CPC . H04W 72/042; H04W 68/02; H04W 68/005; H04W 72/1289; Y02D 30/70
(Continued)

(56) References Cited

U.S. PATENT DOCUMENTS

2018/0077680 A1* 3/2018 Tenny .................. H04W 16/28
2018/0124687 A1* 5/2018 Park ..................... H04L 5/1469
(Continued)

FOREIGN PATENT DOCUMENTS

CN   107251625 A   10/2017
CN   107466101 A   12/2017
(Continued)

OTHER PUBLICATIONS

International Search Report for the International Patent Application No. PCT/CN2018/114195, dated Jan. 28, 2019, 2 pages.
(Continued)

*Primary Examiner* — Inder P Mehra
(74) *Attorney, Agent, or Firm* — KDB Firm PLLC

(57) ABSTRACT

Provided are an information transmission method and device. The method includes that a base station configures, in multiplexing downlink control information (DCI), instruction information for instructing a user equipment (UE) that includes different types to act; and the base station sends the multiplexing DCI to the UE. The multiplexing DCI is DCI that multiplexes DCI of a physical downlink shared channel (PDSCH), and the multiplexing DCI is the DCI of the PDSCH in response to being scrambled by a preset radio network temporary identifier (RNTI) and is paging DCI in response to being scrambled by a paging radio network temporary identifier (P-RNTI), where the preset RNTI is an RNTI excluding the P-RNTI. Instruction information is set in multiplexing DCI to instruct a UE that includes different types to act to switch a paging mechanism.

15 Claims, 6 Drawing Sheets

---

301 — Calculating, by a base station, a paging occasion of a UE

302 — Determining, by the base station, a position of paging DCI in a paging control resource set corresponding to the calculated paging occasion or at a paging search space position corresponding to the calculated paging occasion 303 — Sending, by the base station, the paging DCI to the UE at the determined position

(51) Int. Cl.
*H04W 68/00* (2009.01)
*H04W 72/12* (2009.01)

(58) Field of Classification Search
USPC .......................................................... 370/329
See application file for complete search history.

(56) References Cited

U.S. PATENT DOCUMENTS

| 2018/0234952 | A1* | 8/2018 | Shi | H04L 5/0053 |
|---|---|---|---|---|
| 2019/0104498 | A1* | 4/2019 | Jung | H04W 72/042 |
| 2021/0045098 | A1 | 2/2021 | Bi et al. | |

FOREIGN PATENT DOCUMENTS

| CN | 107534951 A | 1/2018 |
|---|---|---|
| EP | 3737188 A1 | 11/2020 |
| WO | 2017122045 A1 | 7/2017 |
| WO | 2019148920 A1 | 8/2019 |

OTHER PUBLICATIONS

Extended European Search Report for Application No. 18904113.0, dated Aug. 25, 2021, 12 pages.

Office action for Application No. CA3090024, dated Aug. 19, 2021, 4 pages.

Office action for application No. JP2020-541578, dated Jul. 26, 2021, original and translated document, 8 pages.

CMCC, "Discussion on Paging Occasion Design for NR", 3GPP TSG-RAN WG2 NR Ad hoc 1801 Draft R2-1800809 Discussion on Paging Occasion Design for NR (3GPP) Vancouver Canada [online] [retrieved on Jan. 12, 2018]. Retrieved from Internet URL:http://www.3gpp.org/ftp/tsg%5Fran/WG2%5FRL2/TSGR2%5FAHs/2018%5F01%5FNR/Docs/, 3 pages.

LG Electronics, "Paging design in NR", 3GPP TSG RAN WG1 Meeting NR#3, Nagoya, Japan Draft R1-1715844 Discussion and Decision (3GPP) [online] [retrieved on Sep. 17, 2017]. Retrieved from Internet URL:http://www.3gpp.org/ftp/Meetings_3GPP_SYNC/RAN1/Docs/, 5 pages.

MediaTek Inc, "Paging and SS Block Transmission in NR", 3GPP Draft, R2-1801304 Discussion and Decision, (3GPP) Vancouver, Canada [online] [retrieved on Jan. 12, 2018]. Retrieved from Internet URL: http://www.3pgg.org/ftp/tsg%5Fran/WG2%5FRL2/TSGR2%5FAHs/2018%5F01%5FNR/Docs/, 6 pages.

Motorola Mobility, Lenovo "NR paging design" 3GPP TSG RAN WG1 #91 R1-1720921 Discussion and Decision, [online] Nov. 27-Dec. 1, 2017. Retrieved from Internet URL: http://www.3gpp.org/ftp/tsg_ran/WG1_RL1/TSGR1_91/Docs/R1-1720921.zip, 4 pages.

Qualcomm Incorporated, "Paging Design Consideration", 3GPP TSG-RAN WG1 Meeting AH 1801 Draft R1-1800849, (3GPP) Vancouver, Canada [online] [retrieved on Jan. 13, 2018]. Retrieved from Internet URL:http://www.3gpp.org/ftp/tsg%5Fran/WG1%5FRL1/TSGR1%5FAH/NR%5FAH%5F1801/Docs/, 11 pages.

Vivo, "Paging in NR", 3GPP Draft, R2-1800886 Discussion and Decision (3GPP) Vancouver, Canada [online] [retrieved on Jan. 12, 2018]. Retrieved from Internet URL: http://www.3gpp.org/ftp/tsg%5Fran/WG2%5FRL2/TSGR2%5FAHs/2018%5F01%5FNR/Docs/, 4 pages.

* cited by examiner

401

Performing, by a base station, according to the number E of SSBs actually sent, resource association of a set configured on a BWP in a configured or preset manner

Receiving, by a UE, multiplexing DCI sent by a base station, where instruction information for instructing the UE that includes different types to act is configured in the multiplexing DCI, the multiplexing DCI is DCI that multiplexes DCI of a PDSCH through the base station, and the multiplexing DCI is the DCI of the PDSCH in response to being scrambled by an RNTI and is paging DCI in response to being scrambled by a P-RNTI, where the preset RNTI is an RNTI excluding the P-RNTI

502

Acting, by the UE, according to the instruction information configured in the multiplexing DCI

Receiving, by a UE, multiplexing DCI sent by a base station, where the multiplexing DCI is DCI that multiplexes direct-indication DCI through the base station, and the multiplexing DCI is the direct-indication DCI in response to preset bits in the multiplexing DCI indicating a direct indication and is paging DCI in response to the preset bits in the multiplexing DCI indicating paging

602

Acting, by the UE, according to the instruction information configured in the multiplexing DCI

FIG. 8

INFORMATION TRANSMISSION METHOD AND DEVICE

CROSS-REFERENCE TO RELATED APPLICATIONS

This is a National Stage Application, filed under 35 U.S.C. 371, of International Patent Application No. PCT/CN2018/114195, filed on Nov. 6, 2018, which is based on and claims priority to Chinese patent application No. 201810093991.0 filed on Jan. 31, 2018, the disclosures of which are incorporated herein by reference in their entireties.

TECHNICAL FIELD

Embodiments of the present disclosure relate to the field of communications and, in particular, to an information transmission method and device.

BACKGROUND

Traditional radio services generally use spectrum resources ranged from 300 MHz to 3 GHz. These spectrum resources are limited. However, with the continuous advancement of radio technology, various radio services are flourishing. In the face of the increasing demand for bandwidth, these spectrum resources are in extreme shortage and cannot satisfy the requirements of future wireless communications. New Radio (NR) (which includes a 5th generation mobile communication (5G) system or a later system) uses a higher carrier frequency such as 28 GHz, 45 GHz or 70 GHz than the 4th generation mobile communication (4G). Such a high-frequency channel has the defects of having a larger free-propagation loss, being easily absorbed by oxygen and being greatly affected by rain attenuation, thus seriously affecting the coverage performance of a high-frequency communication system. However, a carrier frequency corresponding to such high-frequency communication has a shorter wavelength, ensuring that more antenna elements can be accommodated per unit area. The arrangement of more antenna elements means that the beamforming method can be used to increase antenna gains, ensuring the coverage performance of high-frequency communication. Therefore, the beamforming method for improving antenna gains will undoubtedly be applied to a 5G system.

However, due to the beamforming method, a scanning mode in a paging mechanism consumes an excess of resources. Therefore, the problem of paging mechanism switching needs to be solved in the 3rd Generation Partnership Project (3GPP) Release 15 (Rel-15) so that more paging mechanisms can be applied a UE that belongs to a version later than Rel-15 and the massive congestion of service channels and an excess of invalid uplink access processes can be avoided. However, the existing art lacks a corresponding solution.

SUMMARY

To solve the preceding problem, embodiments of the present disclosure provide an information transmission method and device capable of enabling a user equipment (UE) to act to switch a paging mechanism, thereby avoiding the massive congestion of service channels and an excess of invalid uplink access processes.

To achieve an object of the present disclosure, an embodiment of the present disclosure provides an information transmission method. The method includes that a base station configures, in multiplexing downlink control information (DCI), instruction information for instructing a user equipment (UE) that includes different types to act; and the base station sends the multiplexing DCI to the UE. The multiplexing DCI is DCI that multiplexes DCI of a physical downlink shared channel (PDSCH), and the multiplexing DCI is the DCI of the PDSCH in response to being scrambled by a preset radio network temporary identifier (RNTI) and is paging DCI in response to being scrambled by a paging radio network temporary identifier (P-RNTI), where the preset RNTI is an RNTI excluding the P-RNTI.

An embodiment of the present disclosure provides an information transmission method. The method includes that a user equipment (UE) receives multiplexing downlink control information (DCI) sent by a base station, where the multiplexing DCI is DCI that multiplexes DCI of a physical downlink shared channel (PDSCH) through the base station, and the multiplexing DCI is the DCI of the PDSCH in response to being scrambled by a preset radio network temporary identifier (RNTI) and is paging DCI in response to being scrambled by a paging radio network temporary identifier (P-RNTI), where the preset RNTI is an RNTI excluding the P-RNTI; and the UE acts according to the instruction information configured in the multiplexing DCI.

An embodiment of the present disclosure provides a base station. The base station includes a first processing module configured to set, in multiplexing downlink control information (DCI), instruction information for instructing a user equipment (UE) that includes different types to act; and a first sending module configured to send the multiplexing DCI to the UE. The multiplexing DCI is DCI that multiplexes DCI of a physical downlink shared channel (PDSCH), and the multiplexing DCI is the DCI of the PDSCH in response to being scrambled by a preset radio network temporary identifier (RNTI) and is paging DCI in response to being scrambled by a paging radio network temporary identifier (P-RNTI), where the preset RNTI is an RNTI excluding the P-RNTI.

An embodiment of the present disclosure provides a user equipment (UE). The UE includes a first receiving module configured to receive multiplexing downlink control information (DCI) sent by a base station, where the multiplexing DCI is DCI that multiplexes DCI of a physical downlink shared channel (PDSCH) through the base station, and the multiplexing DCI is the DCI of the PDSCH in response to being scrambled by a preset radio network temporary identifier (RNTI) and is paging DCI in response to being scrambled by a paging radio network temporary identifier (P-RNTI), where the preset RNTI is an RNTI excluding the P-RNTI; and a third processing module configured to act according to instruction information configured in the multiplexing DCI. Compared with the existing art, instruction information is set in multiplexing DCI to instruct a UE that includes different types to act to switch a paging mechanism, thereby avoiding the massive congestion of service channels and an excess of invalid uplink access processes and satisfying the requirements of network deployment and resource scheduling.

An embodiment of the present disclosure provides an information transmission method. The method includes that a base station sets, in multiplexing downlink control information (DCI), instruction information for instructing a user equipment (UE) that includes different types to act; and the base station sends the multiplexing DCI to the UE. The multiplexing DCI is DCI that multiplexes direct-indication DCI, and the multiplexing DCI is the direct-indication DCI in response to preset bits in the multiplexing DCI indicating a direct indication and is paging DCI in response to the preset bits in the multiplexing DCI indicating paging.

An embodiment of the present disclosure provides an information transmission method. The method includes that a user equipment (UE) receives multiplexing downlink control information (DCI) sent by a base station, where the multiplexing DCI is DCI that multiplexes direct-indication DCI through the base station, and the multiplexing DCI is the direct-indication DCI in response to preset bits in the multiplexing DCI indicating a direct indication and is paging DCI in response to the preset bits in the multiplexing DCI indicating paging; and the UE acts according to instruction information configured in the multiplexing DCI.

An embodiment of the present disclosure provides a base station. The base station includes a second processing module configured to set, in multiplexing downlink control information (DCI), instruction information for instructing a user equipment (UE) that includes different types to act; and a second sending module configured to send the multiplexing DCI to the UE. The multiplexing DCI is DCI that multiplexes direct-indication DCI, and the multiplexing DCI is the direct-indication DCI in response to preset bits in the multiplexing DCI indicating a direct indication and is paging DCI in response to the preset bits in the multiplexing DCI indicating paging.

An embodiment of the present disclosure provides a user equipment (UE). The UE includes a second receiving module configured to receive multiplexing downlink control information (DCI) sent by a base station, where the multiplexing DCI is DCI that multiplexes direct-indication DCI through the base station, and the multiplexing DCI is the direct-indication DCI in response to preset bits in the multiplexing DCI indicating a direct indication and is paging DCI in response to the preset bits in the multiplexing DCI indicating paging; and a fourth processing module, which is configured to act according to the instruction information configured in the multiplexing DCI.

Compared with the existing art, instruction information is set in multiplexing DCI to instruct a UE that includes different types to act to switch a paging mechanism, thereby avoiding the massive congestion of service channels and an excess of invalid uplink access processes and satisfying the requirements of network deployment and resource scheduling.

An embodiment of the present disclosure provides an information transmission method. The method includes that a base station calculates a paging occasion of a user equipment (UE); the base station determines a position of paging DCI in a paging control resource set corresponding to the calculated paging occasion or at a paging search space position corresponding to the calculated paging occasion; and the base station sends the paging DCI to the UE at the determined position.

An embodiment of the present disclosure provides an information transmission method. The method includes that a user equipment (UE) calculates a paging occasion of the UE; the UE determines a position of paging DCI in a paging control resource set corresponding to the calculated paging occasion or at a paging search space position corresponding to the calculated paging occasion; and the UE receives, at the determined position, the paging DCI sent by the base station.

An embodiment of the present disclosure provides a base station. The base station includes a first calculation module configured to calculate a paging occasion of a user equipment (UE); a third processing module configured to determine a position of paging DCI in a paging control resource set corresponding to the calculated paging occasion or at a paging search space position corresponding to the calculated paging occasion; and a third sending module configured to send the paging DCI to the UE at the determined position.

An embodiment of the present disclosure provides a user equipment (UE). The UE includes a second calculation module configured to calculate a paging occasion of the UE; a seventh processing module configured to determine a position of paging DCI in a paging control resource set corresponding to the calculated paging occasion or at a paging search space position corresponding to the calculated paging occasion; and a third receiving module configured to receive, at the determined position, the paging DCI sent by the base station.

Compared with the existing art, a paging occasion is calculated so that a base station can send paging DCI on different paging occasions, achieving dispersed paging DCI and avoiding time-frequency domain resource congestion.

An embodiment of the present disclosure provides an information transmission method. The method includes that a base station performs resource association of a set configured on a bandwidth part (BWP) according to synchronization signal blocks (SSBs) actually sent. The configured set includes at least one of a paging control resource set or an other system information (OSI) set.

An embodiment of the present disclosure provides an information transmission method. The method includes that a user equipment (UE) performs resource association of a set configured on a bandwidth part (BWP) according to synchronization signal blocks (SSBs) actually sent in a configured or preset manner. The configured set includes at least one of a paging control resource set or an other system information (OSI) set.

An embodiment of the present disclosure provides a base station. The base station includes a fourth processing module configured to perform resource association of a set configured on a bandwidth part (BWP) according to the number E of synchronization signal blocks (SSBs) actually sent in a configured or preset manner. The configured set includes at least one of a paging control resource set or an other system information (OSI) set.

An embodiment of the present disclosure provides a user equipment (UE). The UE includes an eighth processing module configured to perform resource association of a configured set according to synchronization signal blocks (SSBs) actually sent in a configured or preset manner.

The configured set includes at least one of a paging control resource set or an other system information (OSI) set.

Compared with the existing art, since an association is established between a paging control resource set and an SSB, unnecessary reserved resources are reduced.

Other features and advantages of the present disclosure will be elaborated hereinafter in the description and, moreover, partially become apparent from the description, or will be understood through implementation of the present disclosure. The object and other advantages of the present disclosure may be implemented and obtained through structures set forth in the description, claims and drawings.

BRIEF DESCRIPTION OF DRAWINGS

The drawings are used to provide a further understanding of the solutions of the present disclosure, constitute a part of the description, explain the solutions of the present disclosure in conjunction with embodiments of the present application, and do not limit the solutions of the present disclosure.

FIG. 6 is a flowchart of another information transmission method according to an embodiment of the present disclosure.

FIG. 7 is a flowchart of another information transmission method according to an embodiment of the present disclosure.

FIG. 8 is a flowchart of another information transmission method according to an embodiment of the present disclosure.

DETAILED DESCRIPTION

Figure 1:
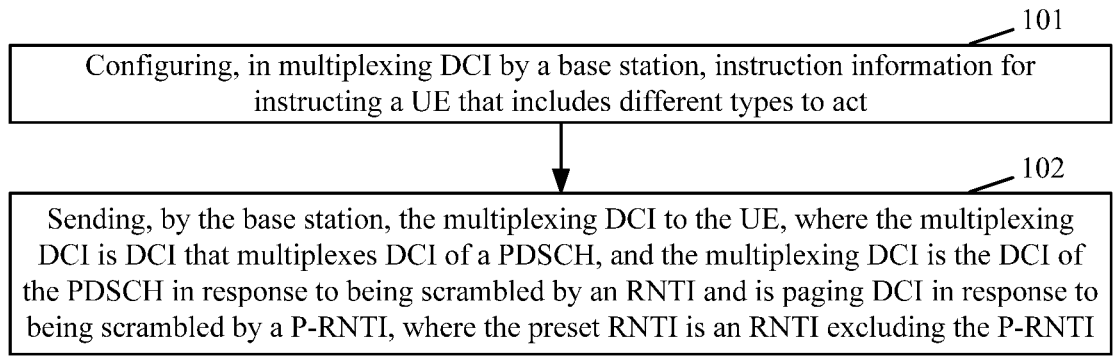
FIG. 1 is a flowchart of an information transmission method according to an embodiment of the present disclosure.

Objects, solutions and advantages of the present disclosure will be more apparent from a detailed description of embodiments of the present disclosure in conjunction with the drawings. It is to be noted that if not in collision, the embodiments and features therein in the present application may be combined with each other.

The steps illustrated in the flowcharts among the drawings may be performed by a computer system such as a group of computers capable of executing instructions. Moreover, although logical sequences are illustrated in the flowcharts, the illustrated or described steps may be performed in sequences different from those described herein in some cases.

Before information transmission methods provided in embodiments of the present disclosure are described, the related knowledge involved is described below.

Paging-related information includes paging scheduling information (also called paging DCI) and a paging message. The paging scheduling information is used for scheduling and assigning the resource position of the paging message. The paging message includes the message of system information modification (systemInfoModification), earthquake tsunami warning system indication (etws-Indication), commercial mobile alert service indication (cmas-Indication), extended access barring parameter modification (eab-ParamModification), redistribution indication (redistributionIndication), system information modification of extended discontinuous reception (systemInfoModification-eDRX), or paging record (PagingRecord) (including s-temporary mobile station identifier (S-TMSI) or international mobile subscriber identity (IMSI)). If the paging message includes only a system message modification type message (such as systemInfoModification, etws-Indication, cmas-Indication, eab-ParamModification, redistributionIndication, or systemInfoModification-eDRX), this type of message may be carried directly in DCI. This mode is called direct indication. A UE detects corresponding paging scheduling information on different paging occasions. Each UE has a corresponding paging occasion. Each paging frame corresponds to one or more paging occasions. If the UE detects no paging scheduling information on the corresponding paging occasion, the UE does not perform a subsequent paging process. If the UE detects paging scheduling information, the UE receives and demodulates the paging message according to the paging scheduling information. If the paging message includes an S-TMSI or IMSI to which the UE belongs, the UE performs a subsequent connection establishment process (The S-TMSI or IMSI exists in the paging message for the purpose of regular calling through and is collectively referred to as UE_ID). If the paging message includes other modification messages or indication messages, the UE performs a subsequent process of receiving a corresponding message. For example, if the message is systemInfoModification, the UE performs a subsequent process of receiving a system message. The following briefly describes modes of NR (Rel-15 NR) paging mechanisms. In a sweeping mode, both paging DCI and paging messages require beam scanning transmission. In a trigger mode, a paging group indicator triggers a UE to feed back a better downlink transmit beam and then a network sends paging DCI and/or a paging message only on the downlink transmit beam fed back by the UE. In a power saving mode, a UE does not receive paging DCI unless instructed by a paging (group). In a compression mode, the overheads of UE_ID in a paging message are reduced. The scanning mode is the basic mechanism of NR paging mechanisms, but the scanning mode incurs more scanning overheads, so it is necessary to consider how to apply the trigger mode, power saving mode, compression mode or another mode in Rel-15 to a version later than Rel-15 in a mode of forward compatibility.

An embodiment of the present disclosure provides an information transmission method. As shown in FIG. 1, the method includes the steps 101 and 102 below.

In step 101, a base station configures, in multiplexing downlink control information (DCI), instruction information for instructing a user equipment (UE) that includes different types to act.

In step 102, the base station sends the multiplexing DCI to the UE.

The multiplexing DCI is DCI that multiplexes DCI of a physical downlink shared channel (PDSCH), and the multiplexing DCI is the DCI of the PDSCH in response to being scrambled by a preset radio network temporary identifier (RNTI) and is paging DCI in response to being scrambled by a paging radio network temporary identifier (P-RNTI), where the preset RNTI is an RNTI excluding the P-RNTI.

In the information transmission method provided in the present disclosure, instruction information is set in multiplexing DCI to instruct a UE that includes different types to act to switch a paging mechanism, thereby avoiding the massive congestion of service channels and excessive invalid uplink access processes and satisfying the requirements of network deployment and resource scheduling.

Optionally, configuring, in the multiplexing DCI by the base station, the instruction information for instructing the UE that includes different types to act includes: adding, by the base station, A bits to the multiplexing DCI and defining, by the base station, a meaning of the A bits for instructing the UE to act, where the multiplexing DCI includes X bits and the UE includes a first type UE and a second type UE, where the first type UE is a UE that belongs to 3rd Generation Partnership Project (3GPP) Rel-15 and the second type UE is a UE that belongs to a version later than Rel-15; or selecting, by the base station, R bits from the multiplexing DCI and defining, by the base station, a meaning of the R bits for the purpose of instructing the UE to act, where R is less than X; or dividing, by the base station, the P-RNTI into two types and defining, by the base station, meanings of the two types of P-RNTIs for the purpose of instructing the first type UE and the second type UE to act.

Optionally, adding, by the base station, the A bits to the multiplexing DCI and defining, by the base station, the meaning of the A bits includes: defining, by the base station, that in response to the multiplexing DCI being scrambled by the preset RNTI, the meaning of an A-bit state is to instruct the first type UE and the second type UE to discard the A bits; defining, by the base station, that in response to the multiplexing DCI being scrambled by the P-RNTI and the A-bit state being a preset state, the meaning of the A-bit state is to instruct the first type UE and the second type UE to detect a paging message sent in a scanning mode; and defining, by the base station, that in response to the multiplexing DCI being scrambled by the P-RNTI and the A-bit state being a state excluding the preset state, the meaning of the A bits is to instruct the first type UE to discard the multiplexing DCI and instruct the second type UE to switch to at least one of a corresponding non-scanning mode or a paging instruction, where the paging instruction is a single paging instruction or a paging instruction set, and the preset state is randomly preselected from all states corresponding to the A bits and used for instructing the first type UE and the second type UE to detect the paging message sent in the scanning mode.

Optionally, adding, by the base station, the A bits to the multiplexing DCI and defining, by the base station, the meaning of the A bits includes: defining, by the base station, that in response to the multiplexing DCI being scrambled by the preset RNTI, the meaning of an A-bit state is to instruct the first type UE and the second type UE to discard the A bits; and defining, by the base station, that in response to the multiplexing DCI being scrambled by the P-RNTI, the meaning of the A-bit state is to instruct the first type UE to discard the A bits and detect a paging message sent in a scanning mode and instruct the second type UE to switch to at least one of a corresponding non-scanning mode or a paging instruction, where the paging instruction is a single paging instruction or a paging instruction set.

Optionally, selecting, by the base station, the R bits from the multiplexing DCI and defining, by the base station, the meaning of the R bits includes: defining, by the base station, that in response to the multiplexing DCI being scrambled by the P-RNTI and an R-bit state being a preset state, the meaning of the R-bit state is to instruct the first type UE and the second type UE to detect a paging message sent in a scanning mode; and defining, by the base station, that in response to the multiplexing DCI being scrambled by the P-RNTI and the R-bit state being a state excluding the preset state, the meaning of the R bits is to instruct the first type UE to discard the multiplexing DCI and instruct the second type UE to switch to at least one of a corresponding non-scanning mode or a paging instruction, where the paging instruction is a single paging instruction or a paging instruction set, and the preset state is randomly preselected from all states corresponding to the R bits and used for instructing the first type UE and the second type UE to detect the paging message sent in the scanning mode.

Optionally, selecting, by the base station, the R bits from the multiplexing DCI and defining, by the base station, the meaning of the R bits includes: defining, by the base station, that in response to the multiplexing DCI being scrambled by the P-RNTI, the meaning of an R-bit state is to instruct the first type UE to detect a paging message sent in a scanning mode and instruct the second type UE to switch to at least one of a corresponding non-scanning mode or a paging instruction, where the paging instruction is a single paging instruction or a paging instruction set. Optionally, dividing, by the base station, the P-RNTI into two types and defining, by the base station, the meanings of the two types of P-RNTIs includes: defining, by the base station, that in response to the multiplexing DCI being scrambled by the first type of P-RNTI, the meaning of the first type of P-RNTI is to instruct the first type UE and the second type UE to detect a paging message sent in a scanning mode; and defining, by the base station, that in response to the multiplexing DCI being scrambled by the second type of P-RNTI, the meaning of the second type of P-RNTI is to instruct the first type UE to discard the multiplexing DCI or instruct the first type UE to discard the multiplexing DCI after the multiplexing DCI is descrambled by the second type of P-RNTI and instruct the second type UE to switch to at least one of a corresponding non-scanning mode or a paging instruction, where the paging instruction is a single paging instruction or a paging instruction set.

It is to be noted that the multiplexing DCI mentioned in this embodiment of the present disclosure multiplexes DCI of a PSCDH.

In the information transmission method provided in this embodiment of the present disclosure, instruction information is set in multiplexing DCI to instruct a UE that includes different types to act to switch a paging mechanism, thereby avoiding the massive congestion of service channels and excessive invalid uplink access processes and satisfying the requirements of network deployment and resource scheduling.

Figure 2:
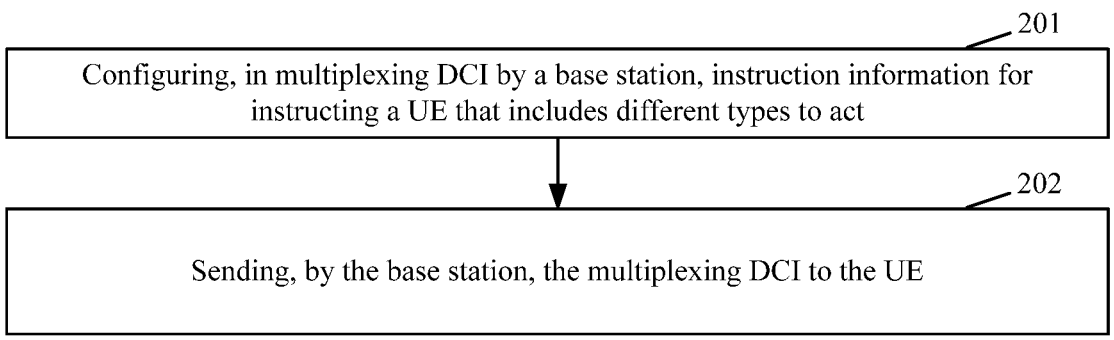
FIG. 2 is a flowchart of another information transmission method according to an embodiment of the present disclosure.

An embodiment of the present disclosure provides an information transmission method. As shown in FIG. 2, the method includes the steps 201 and 202 below.

In step 201, a base station configures, in multiplexing downlink control information (DCI), instruction information for instructing a user equipment (UE) that includes different types to act.

In step 202, the base station sends the multiplexing DCI to the UE.

The multiplexing DCI is DCI that multiplexes direct-indication DCI, and the multiplexing DCI is the direct-indication DCI in response to preset bits in the multiplexing DCI indicating a direct indication and is paging DCI in response to the preset bits in the multiplexing DCI indicating paging.

Optionally, configuring, in the multiplexing DCI by the base station, the instruction information for instructing the UE that includes different types to act includes: adding, by the base station, B bits to the multiplexing DCI and defining, by the base station, a meaning of the B bits for instructing the UE to act, where the multiplexing DCI includes Y bits and the UE includes a first type UE and a second type UE, where the first type UE is a UE that belongs to 3rd Generation Partnership Project (3GPP) Rel-15 and the second type UE is a UE that belongs to a version later than Rel-15; or selecting, by the base station, S bits from the multiplexing DCI and defining, by the base station, a meaning of the S bits for the purpose of instructing the UE to act, where S is less than Y; or dividing, by the base station, the P-RNTI into two types and defining, by the base station, meanings of the two types of P-RNTIs for the purpose of instructing the first type UE and the second type UE to act.

Optionally, adding, by the base station, the B bits to the multiplexing DCI and defining, by the base station, the meaning of the B bits includes: defining, by the base station, that in response to the preset bits of the multiplexing DCI indicating the direct indication, the meaning of a B-bit state is to instruct the first type UE and the second type UE to discard the B bits; defining, by the base station, that in response to the preset bits of the multiplexing DCI indicating the paging and the B-bit state being a preset state, the meaning of the B-bit state is to instruct the first type UE and the second type UE to detect a paging message sent in a scanning mode; and defining, by the base station, that in response to the preset bits of the multiplexing DCI indicating the paging and the B-bit state being a state excluding the preset state, the meaning of the B bits is to instruct the first type UE to discard the multiplexing DCI and instruct the second type UE to switch to at least one of a corresponding non-scanning mode or a paging instruction, where the paging instruction is a single paging instruction or a paging instruction set, and the preset state is randomly preselected from all states corresponding to the B bits and used for instructing the first type UE and the second type UE to detect the paging message sent in the scanning mode.

Optionally, adding, by the base station, the B bits to the multiplexing DCI and defining, by the base station, the meaning of the B bits includes: defining, by the base station, that in response to the preset bits of the multiplexing DCI indicating the direct indication, the meaning of a B-bit state is to instruct the first type UE and the second type UE to discard the B bits; and defining, by the base station, that in response to the preset bits of the multiplexing DCI indicating the paging, the meaning of the B-bit state is to instruct the first type UE to discard the B bits and detect a paging message sent in a scanning mode and instruct the second type UE to switch to at least one of a corresponding non-scanning mode or a paging instruction, where the paging instruction is a single paging instruction or a paging instruction set.

Optionally, selecting, by the base station, the S bits from the multiplexing DCI and defining, by the base station, the meaning of the S bits includes: defining, by the base station, that in response to the preset bits of the multiplexing DCI indicating the paging and an S-bit state being a preset state, the meaning of the S-bit state is to instruct the first type UE and the second type UE to detect a paging message sent in a scanning mode; and defining, by the base station, that in response to the preset bits of the multiplexing DCI indicating the paging and the S-bit state being a state excluding the preset state, the meaning of the S bits is to instruct the first type UE to discard the multiplexing DCI and instruct the second type UE to switch to at least one of a corresponding non-scanning mode or a paging instruction, where the paging instruction is a single paging instruction or a paging instruction set, and the preset state is randomly preselected from all states corresponding to the S bits and used for instructing the first type UE and the second type UE to detect the paging message sent in the scanning mode.

Optionally, selecting, by the base station, the S bits from the multiplexing DCI and defining, by the base station, the meaning of the S bits includes: defining, by the base station, that in response to the preset bits of the multiplexing DCI indicating the paging, the meaning of an S-bit state is to instruct the first type UE to detect a paging message sent in a scanning mode and instruct the second type UE to switch to at least one of a corresponding non-scanning mode or a paging instruction, where the paging instruction is a single paging instruction or a paging instruction set.

Optionally, dividing, by the base station, the P-RNTI into two types and defining, by the base station, the meanings of the two types of P-RNTIs includes: defining, by the base station, that in response to the multiplexing DCI being scrambled by the first type of P-RNTI, the meaning of the first type of P-RNTI is to instruct the first type UE and the second type UE to detect a paging message sent in a scanning mode; and defining, by the base station, that in response to the multiplexing DCI being scrambled by the second type of P-RNTI, the meaning of the second type of P-RNTI is to instruct the first type UE to discard the multiplexing DCI or instruct the first type UE to discard the multiplexing DCI after the multiplexing DCI is descrambled by the second type of P-RNTI and instruct the second type UE to switch to at least one of a corresponding non-scanning mode or a paging instruction, where the paging instruction is a single paging instruction or a paging instruction set.

It is to be noted that the multiplexing DCI mentioned in this embodiment of the present disclosure multiplexes direct-indication DCI.

In the information transmission method provided in this embodiment of the present disclosure, instruction information is set in multiplexing DCI to instruct a UE that includes different types to act to switch a paging mechanism, thereby avoiding the massive congestion of service channels and excessive invalid uplink access processes and satisfying the requirements of network deployment and resource scheduling.

Figure 3:
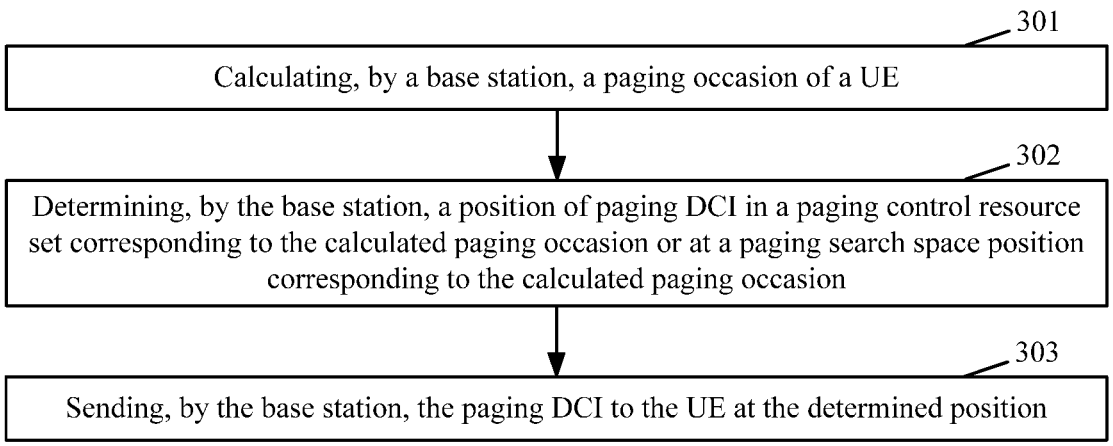
FIG. 3 is a flowchart of another information transmission method according to an embodiment of the present disclosure.

An embodiment of the present disclosure provides an information transmission method. As shown in FIG. 3, the method includes the steps 301, 302 and 303 below.

In step 301, a base station calculates a paging occasion of a user equipment (UE).

In step 302, the base station determines a position of paging DCI in a paging control resource set corresponding to the calculated paging occasion or at a paging search space position corresponding to the calculated paging occasion.

In step 303, the base station sends the paging DCI to the UE at the determined position.

Optionally, calculating, by the base station, the paging occasion of the UE includes: in response to a discontinuous reception (DRX) cycle including P paging occasions in a time-domain direction, calculating, by the base station, the paging occasion of the UE by using UE_ID mod (P); and in response to the DRX cycle including N paging frames and each of the paging frames including P paging occasions in the time-domain direction, calculating, by the base station, the paging occasion of the UE by using floor (UE_ID/N) mod (P), where the UE_ID is an s-temporary mobile station identifier (S-TMSI) or an international mobile subscriber identity (IMSI) in a paging message, and the number of paging control resource sets or paging search spaces in a frequency-domain direction corresponding to the paging occasions in the time-domain direction is not greater than the number of bandwidth parts (BWPs).

Figure 4:
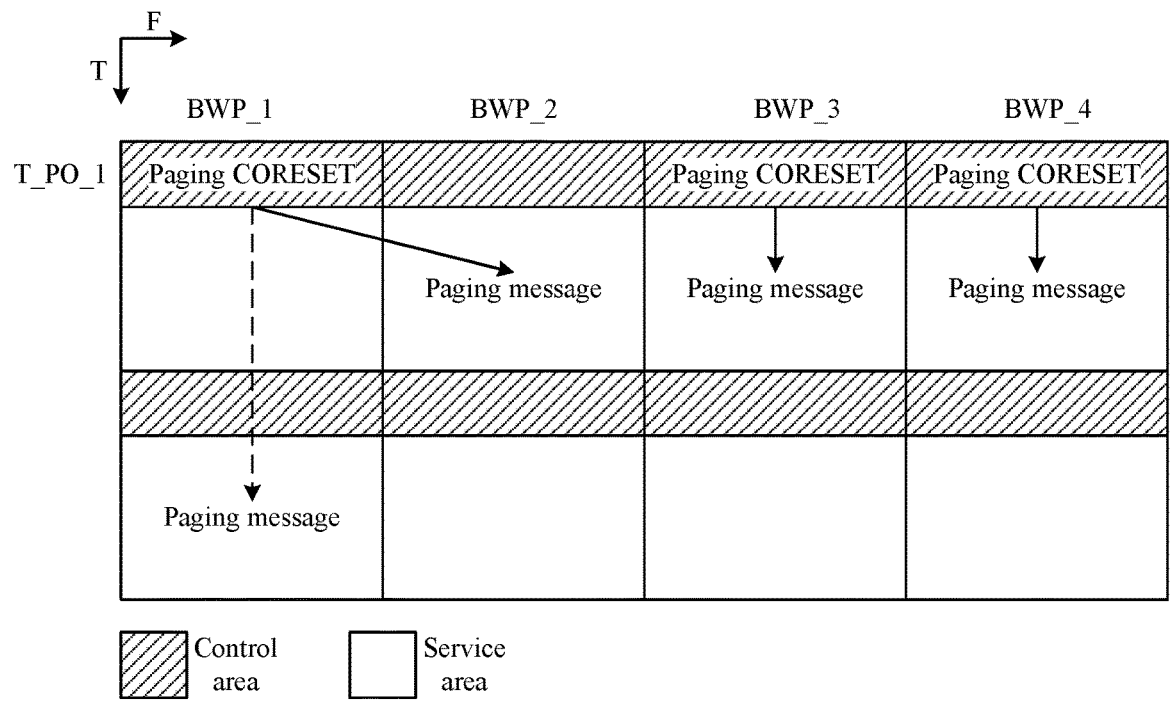
FIG. 4 is a schematic diagram illustrating that a DRX cycle includes P paging occasions in the time-domain direction according to an embodiment of the present disclosure.

It is to be noted that a schematic diagram illustrating that a DRX cycle includes P paging occasions in the time-domain direction may be as shown in FIG. 4.

Optionally, sending, by the base station, the paging DCI to the UE at the determined position includes: sending, on each of the paging control resource sets in the frequency-domain direction corresponding to the paging occasions in the time-domain direction or at each of the search space positions in the frequency-domain direction corresponding to the paging occasions in the time-domain direction by the base station, paging DCI corresponding to all paged UEs on the paging occasions in the time-domain direction; and sending, by the base station according to the paging DCI, the paging message at a resource position of the paging message.

Optionally, sending, by the base station according to the paging DCI, the paging message at the resource position of the paging message includes: in response to the paging DCI including a time domain position indication field of the paging message, sending, by the base station, the paging message on a time-domain resource corresponding to the time domain position indication field; in response to the paging DCI including a BWP index of the paging message, sending, by the base station, the paging message on a BWP resource corresponding to the BWP index; and in response to the paging DCI including the time domain position indication field and the BWP index of the paging message, detecting, by the base station, the paging message on the time-domain resource corresponding to the time domain position indication field and the BWP resource corresponding to the BWP index.

Optionally, calculating, by the base station, the paging occasion of the UE includes: in response to a discontinuous reception (DRX) cycle including P paging occasions in a time-domain direction and Q paging occasions in a frequency-domain direction, calculating, by the base station, the paging occasion of the UE by using a first preset calculation method; and in response to the DRX cycle including N paging frames and each of the paging frames including P paging occasions in the time-domain direction and Q paging occasions in the frequency-domain direction, calculating, by the base station, the paging occasion of the UE by using a second preset calculation method, where the first preset calculation method includes any one of UE_ID mod (P*Q), UE_ID mod (P) mod (Q), or UE_ID mod (Q) mod (P) and the second preset calculation method includes any one of floor (UE_ID/N) mod (P*Q), floor (UE_ID/N) mod (P) mod (Q), or floor (UE_ID/N) mod (Q) mod (P), where the UE_ID is an s-temporary mobile station identifier (S-TMSI) or an international mobile subscriber identity (IMSI) in the paging message, the Q paging occasions in the frequency-domain direction correspond to Q paging control resource sets or paging search spaces, and Q is not greater than the number of bandwidth parts (BWPs).

Figure 5:
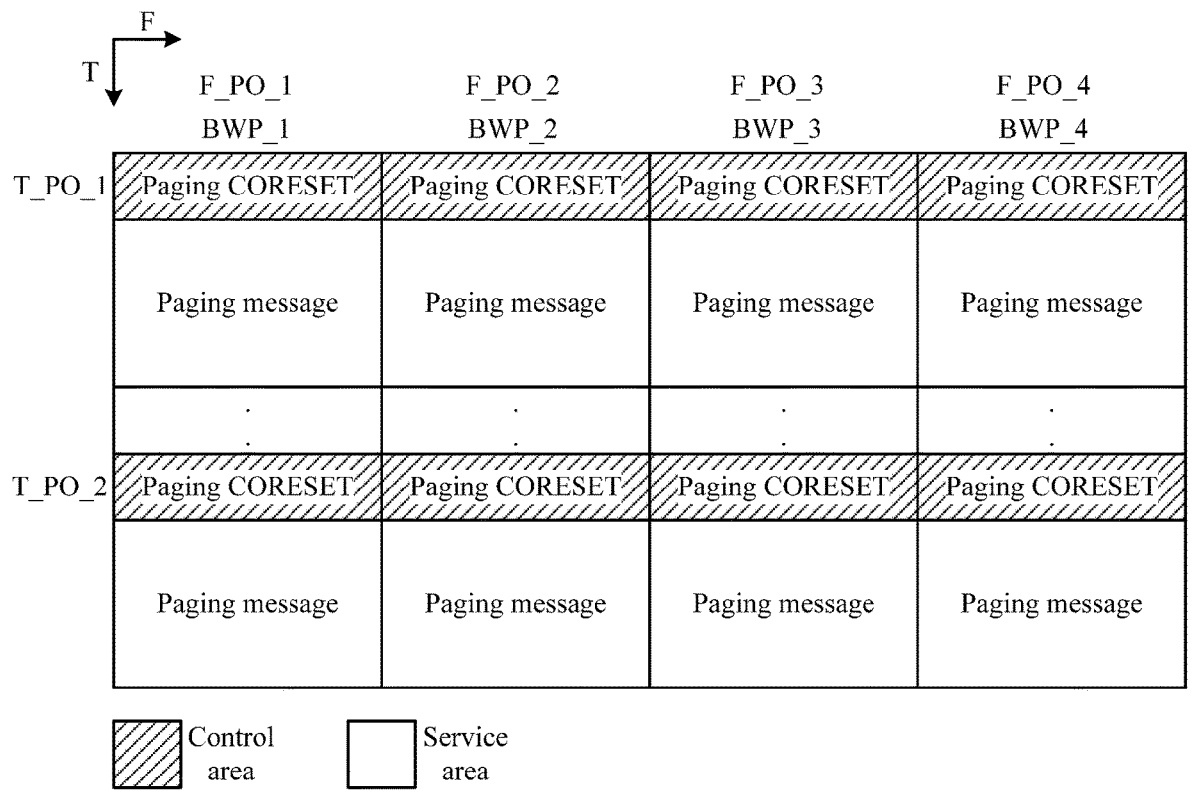
FIG. 5 is a schematic diagram illustrating that a DRX cycle includes P paging occasions in the time-domain direction and Q paging occasions in the frequency-domain direction according to an embodiment of the present disclosure.

It is to be noted that a schematic diagram illustrating that a DRX cycle includes P paging occasions in the time-domain direction and Q paging occasions in the frequency-domain direction may be as shown in FIG. 5.

Optionally, sending, by the base station, the paging DCI to the UE at the determined position includes: sending, in a paging control resource set of one of the paging occasions in the frequency-domain direction corresponding to the paging occasions in the time-domain direction or at a paging search space position of the one of the paging occasions in the frequency-domain direction corresponding to the paging occasions in the time-domain direction by the base station, paging DCI corresponding to all paged UEs on the one of the paging occasions in the frequency-domain direction corresponding to the paging occasions in the time-domain direction; and sending, by the base station according to the paging DCI, the paging message at a resource position of the paging message.

Optionally, sending, by the base station according to the paging DCI, the paging message at the resource position of the paging message includes: in response to the paging DCI including a time domain position indication field of the paging message, sending, by the base station, the paging message on a time-domain resource corresponding to the time domain position indication field; in response to the paging DCI including a BWP index of the paging message, sending, by the base station, the paging message on a BWP resource corresponding to the BWP index; and in response to the paging DCI including the time domain position indication field and the BWP index of the paging message, detecting, by the base station, the paging message on the time-domain resource corresponding to the time domain position indication field and the BWP resource corresponding to the BWP index.

Optionally, the paging control resource sets and the paging search spaces are not allocated on a bandwidth part (BWP) indicated by a BWP index.

Optionally, in condition that a synchronization signal block (SSB) is not existed on a BWP and at least one of the paging control resource set, an other system information (OSI) set or a remaining minimum system information (RMSI) set is configured on the BWP, the base station performs resource mapping of the configured set in a manner in which the SSB is existed, and a time-frequency resource configuration of the set is the same as a time-frequency resource configuration of an RMSI set on an initial access BWP, where a first resource block index of the SSB is detected and obtained by the UE or configured by the base station; or the time-frequency resource configuration of the set is the same as the time-frequency resource configuration of the RMSI set on the initial access BWP, where the first resource block index of the SSB is configured by the base station.

Optionally, in condition that at least one of the paging control resource set, an other system information (OSI) set or a remaining minimum system information (RMSI) set is configured on the BWP, regardless of whether a synchronization signal block (SSB) is existed on the BWP, the base station performs resource mapping of the configured set in a manner in which the SSB is existed, and a time-frequency resource configuration of the set is the same as a time-frequency resource configuration of an RMSI set on an initial access BWP, where a first resource block index of the SSB is detected and obtained by the UE or configured by the base station; or the time-frequency resource configuration of the set is the same as the time-frequency resource configuration of the RMSI set on the initial access BWP, where the first resource block index of the SSB is configured by the base station.

In the information transmission method provided in this embodiment of the present disclosure, a paging occasion is calculated so that a base station can send paging DCI on different paging occasions, achieving dispersed paging DCI and avoiding time-frequency domain resource congestion.

An embodiment of the present disclosure provides an information transmission method. As shown in FIG. 6, the method includes the step below.

In step 401, a base station performs, according to the number E of synchronization signal blocks (SSBs) actually sent, resource association of a set configured on a bandwidth part (BWP) in a configured or preset manner.

The configured set includes at least one of a paging control resource set or an other system information (OSI) set.

Optionally, performing, by the base station according to the number E of SSBs actually sent, the resource association of the set configured on the BWP in the configured or preset manner includes: adjusting, by the base station, associated SSB indexes according to the number E of SSBs actually sent in the configured or preset manner to obtain the adjusted associated SSB indexes i; and calculating, by the base station according to i, a first time slot index of the set configured on the BWP, where i=j+offset, j denotes logical indexes of the SSBs actually sent, j and the logical indexes of the SSBs actually sent are in one-to-one correspondence with each other in ascending order, a value range of j is {0, 1, 2, . . . , E−1}, and offset denotes the amount of offset.

Optionally, performing, by the base station, the resource association of the set configured on the BWP according to the number E of SSBs actually sent in the configured or preset manner includes: in response to the base station adjusting associated SSB indexes i according to the number E of SSBs actually sent in the preset manner, calculating, by the base station according to i, a first time slot index of the set configured on the BWP, where i are logical indexes j in one-to-one correspondence with the SSBs actually sent and a first position for sending an SSB is used as a starting position of the logical indexes j; or i are logical indexes j in one-to-one correspondence with the SSBs actually sent and a first position at which an SSB is actually sent is used as a starting position of the logical indexes j; or i are logical indexes j in one-to-one correspondence with the SSBs actually sent and an (F−E+1)th position for sending an SSB is used as a starting position of the logical indexes j, where a value range of j is {0, 1, 2, . . . , E−1}.

Optionally, performing, by the base station, the resource association of the set configured on the BWP according to the number E of SSBs actually sent in the configured or preset manner includes: adjusting, by the base station according to the number E of SSBs actually sent, associated SSB indexes in the configured manner.

Optionally, a search window of a configured resource set associated with the SSB indexes is a search window of a remaining minimum system information (RMSI) associated with the SSB indexes or is a search window excluding the search window of the RMSI associated with the SSB indexes.

In the information transmission method provided in this embodiment of the present disclosure, since an association is established between a paging control resource set and an SSB, unnecessary reserved resources are reduced.

An embodiment of the present disclosure provides an information transmission method. As shown in FIG. 7, the method includes the steps 501 and 502 below.

In step 501, a user equipment (UE) receives multiplexing downlink control information (DCI) sent by a base station.

Instruction information for instructing the UE that includes different types to act is set in the multiplexing DCI, the multiplexing DCI is DCI that multiplexes DCI of a physical downlink shared channel (PDSCH) through the base station, and the multiplexing DCI is the DCI of the PDSCH in response to being scrambled by a preset radio network temporary identifier (RNTI) and is paging DCI in response to being scrambled by a paging radio network temporary identifier (P-RNTI), where the preset RNTI is an RNTI excluding the P-RNTI.

In step 502, the UE acts according to the instruction information configured in the multiplexing DCI.

Optionally, acting, by the UE, according to the instruction information configured in the multiplexing DCI includes: in response to the base station adding A bits to the multiplexing DCI and defining a meaning of the A bits, acting, by the UE, according to the A bits, where the multiplexing DCI includes X bits and the UE includes a first type UE and a second type UE, where the first type UE is a UE that belongs to 3rd Generation Partnership Project (3GPP) Rel-15 and the second type UE is a UE that belongs to a version later than Rel-15; or in response to the base station selecting R bits from the multiplexing DCI and defining a meaning of the R bits, acting, by the UE, according to the R bits, where R is less than X; or in response to the base station dividing the P-RNTI into two types and defining meanings of the two types of P-RNTIs, acting, by the UE, according to a meaning of a first type of P-RNTI and a meaning of a second type of P-RNTI.

Optionally, in response to the UE being the first type UE and being in version Rel-15 or in response to the UE being the first type UE and belonging to the version later than Rel-15, acting, by the UE, according to the A bits includes: in response to the first type UE detecting that the multiplexing DCI is scrambled by the preset RNTI, discarding, by the first type UE, the A bits and detecting, by the first type UE, a corresponding PDSCH according to the X bits; in response to the first type UE detecting that the multiplexing DCI is scrambled by the P-RNTI and an A-bit state is a preset state, detecting, by the first type UE according to the X bits or bits excluding a paging instruction bit field in the X bits, a paging message sent in a scanning mode; and in response to the first type UE detecting that the multiplexing DCI is scrambled by the P-RNTI and the A-bit state is a state excluding the preset state, discarding, by the first type UE, the multiplexing DCI, where the A-bit state corresponds to the A bits, the preset state is arbitrarily preselected from all states corresponding to the A bits to instruct the first type UE and the second type UE to detect the paging message sent in the scanning mode, and the paging instruction bit field includes at least one of a hybrid automatic repeat request (HARQ) process number bit field or a downlink allocation index bit field.

Optionally, in response to the UE being the second type UE and belonging to the version later than Rel-15, acting, by the UE, according to the A bits includes: in response to the second type UE detecting that the multiplexing DCI is scrambled by the preset RNTI, discarding, by the second type UE, the A bits and detecting, by the second type UE, a corresponding PDSCH according to the X bits; in response to the second type UE detecting that the multiplexing DCI is scrambled by the P-RNTI and an A-bit state is a preset state, detecting, by the second type UE according to the X bits or bits excluding a paging instruction bit field in the X bits, a paging message sent in a scanning mode; and in response to the second type UE detecting that the multiplexing DCI is scrambled by the P-RNTI and the A-bit state is a state excluding the preset state, switching, by the second type UE, to at least one of a corresponding non-scanning mode or a paging instruction according to the X bits or the bits excluding the paging instruction bit field in the X bits, where the paging instruction is a single paging instruction or a paging instruction set.

Optionally, in response to the UE being the first type UE and being in version Rel-15 or in response to the UE being the first type UE and belonging to the version later than Rel-15, acting, by the UE, according to the A bits includes: in response to the first type UE detecting that the multiplexing DCI is scrambled by the preset RNTI, discarding, by the first type UE, the A bits and detecting, by the first type UE, a corresponding PDSCH according to the X bits; and in response to the first type UE detecting that the multiplexing DCI is scrambled by the P-RNTI, discarding, by the first type UE, the A bits and detecting, by the first type UE according to the X bits or bits excluding a paging instruction bit field in the X bits, a paging message sent in a scanning mode, where the paging instruction is a single paging instruction or a paging instruction set, and the paging instruction bit field includes at least one of a hybrid automatic repeat request (HARQ) process number bit field or a downlink allocation index bit field.

Optionally, in response to the UE being the second type UE and belonging to the version later than Rel-15, acting, by the UE, according to the A bits includes: in response to the second type UE detecting that the multiplexing DCI is scrambled by the preset RNTI, discarding, by the second type UE, the A bits and detecting, by the second type UE, a corresponding PDSCH according to the X bits; and in response to the second type UE detecting that the multiplexing DCI is scrambled by the P-RNTI, switching, by the second type UE, to at least one of a corresponding non-scanning mode or a paging instruction according to the X bits or the bits excluding the paging instruction bit field in the X bits, where the paging instruction is a single paging instruction or a paging instruction set.

Optionally, in response to the UE being the first type UE and being in version Rel-15 or in response to the UE being the first type UE and belonging to the version later than Rel-15, acting, by the UE, according to the R bits includes: in response to the first type UE detecting that the multiplexing DCI is scrambled by the preset RNTI, detecting, by the first type UE, a corresponding PDSCH according to the X bits; in response to the first type UE detecting that the multiplexing DCI is scrambled by the P-RNTI and an R-bit state is a preset state, detecting, by the first type UE according to (X-R) bits or bits excluding a paging instruction bit field in the (X-R) bits, a paging message sent in a scanning mode; and in response to the first type UE detecting that the multiplexing DCI is scrambled by the P-RNTI and the R-bit state is a state excluding the preset state, discarding, by the first type UE, the multiplexing DCI, where the R-bit state corresponds to the R bits, the preset state is arbitrarily preselected from all states corresponding to the R bits to instruct the first type UE and the second type UE to detect the paging message sent in the scanning mode, and the paging instruction bit field includes at least one of a hybrid automatic repeat request (HARQ) process number bit field or a downlink allocation index bit field.

Optionally, in response to the UE being the second type UE and belonging to the version later than Rel-15, acting, by the UE, according to the R bits includes: in response to the second type UE detecting that the multiplexing DCI is scrambled by the preset RNTI, detecting, by the second type UE, a corresponding PDSCH according to the X bits; in response to the second type UE detecting that the multiplexing DCI is scrambled by the P-RNTI and an R-bit state is a preset state, detecting, by the second type UE according to (X-R) bits or bits excluding a paging instruction bit field in the (X-R) bits, a paging message sent in a scanning mode; and in response to the second type UE detecting that the multiplexing DCI is scrambled by the P-RNTI and the R-bit state is a state excluding the preset state, switching, by the second type UE, to at least one of a corresponding non-scanning mode or a paging instruction according to the (X-R) bits or the bits excluding the paging instruction bit field in the (X-R) bits, where the paging instruction is a single paging instruction or a paging instruction set.

Optionally, in response to the UE being the first type UE and being in version Rel-15 or in response to the UE being the first type UE and belonging to the version later than Rel-15, acting, by the UE, according to the R bits includes: in response to the first type UE detecting that the multiplexing DCI is scrambled by the preset RNTI, detecting, by the first type UE, a corresponding PDSCH according to the X bits; and in response to the first type UE detecting that the multiplexing DCI is scrambled by the P-RNTI, detecting, by the first type UE according to (X-R) bits or bits excluding a paging instruction bit field in the (X-R) bits, a paging message sent in a scanning mode, where an R-bit state corresponds to the R bits, the preset state is arbitrarily preselected from all states corresponding to the R bits to instruct the first type UE and the second type UE to detect the paging message sent in the scanning mode, and the paging instruction bit field includes at least one of a hybrid automatic repeat request (HARQ) process number bit field or a downlink allocation index bit field.

Optionally, in response to the UE being the second type UE and belonging to the version later than Rel-15, acting, by the UE, according to the R bits includes: in response to the second type UE detecting that the multiplexing DCI is scrambled by the preset RNTI, detecting, by the second type UE, a corresponding PDSCH according to the X bits; and in response to the second type UE detecting that the multiplexing DCI is scrambled by the P-RNTI, switching, by the second type UE, to at least one of a corresponding non-scanning mode or a paging instruction according to the (X-R) bits or the bits excluding the paging instruction bit field in the (X-R) bits, where the paging instruction is a single paging instruction or a paging instruction set.

Optionally, in response to the UE being the first type UE and being in version Rel-15 or in response to the UE being the first type UE and belonging to the version later than Rel-15, acting, by the UE, according to the meaning of the first type of P-RNTI and the meaning of the second type of P-RNTI includes: in response to the first type UE detecting that the multiplexing DCI is scrambled by the preset RNTI, detecting, by the first type UE, a corresponding PDSCH according to the X bits; in response to the first type UE detecting that the multiplexing DCI is scrambled by the first type of P-RNTI, detecting, by the first type UE according to the X bits or bits excluding a paging instruction bit field in the X bits, a paging message sent in a scanning mode; and in response to the first type UE detecting that the multiplexing DCI is scrambled by the second type of P-RNTI, discarding, by the first type UE, the multiplexing DCI or discarding, by the first type UE, the multiplexing DCI after the multiplexing DCI is descrambled by the second type of P-RNTI.

Optionally, in response to the UE being the second type UE and belonging to the version later than Rel-15, acting, by the UE, according to the meaning of the first type of P-RNTI and the meaning of the second type of P-RNTI includes: in response to the second type UE detecting that the multiplexing DCI is scrambled by the preset RNTI, detecting, by the second type UE, a corresponding PDSCH according to the X bits; in response to the second type UE detecting that the multiplexing DCI is scrambled by the first type of P-RNTI, detecting, by the second type UE according to the X bits or bits excluding a paging instruction bit field in the X bits, a paging message sent in a scanning mode; and in response to the second type UE detecting that the multiplexing DCI is scrambled by the second type of P-RNTI, switching, by the second type UE, to at least one of a corresponding non-scanning mode or a paging instruction according to the X bits or the bits excluding the paging instruction bit field in the X bits, where the paging instruction is a single paging instruction or a paging instruction set.

It is to be noted that the multiplexing DCI mentioned in this embodiment of the present disclosure multiplexes DCI of a PSCDH.

In the information transmission method provided in this embodiment of the present disclosure, instruction information is set in multiplexing DCI to instruct a UE that includes different types to act to switch a paging mechanism, thereby avoiding the massive congestion of service channels and excessive invalid uplink access processes and satisfying the requirements of network deployment and resource scheduling.

An embodiment of the present disclosure provides an information transmission method. As shown in FIG. 8, the method includes the steps 601 and 602 below.

In step 601, a user equipment (UE) receives multiplexing downlink control information (DCI) sent by a base station.

The multiplexing DCI is DCI that multiplexes direct-indication DCI through the base station, and the multiplexing DCI is the direct-indication DCI in response to preset bits in the multiplexing DCI indicating a direct indication and is paging DCI in response to the preset bits in the multiplexing DCI indicating paging.

In step 602, the UE acts according to the instruction information configured in the multiplexing DCI.

Optionally, acting, by the UE, according to the instruction information configured in the multiplexing DCI includes: in response to the base station adding B bits to the multiplexing DCI and defining a meaning of the B bits, acting, by the UE, according to the B bits, where the multiplexing DCI includes Y bits and the UE includes a first type UE and a second type UE, where the first type UE is a UE that belongs to 3rd Generation Partnership Project (3GPP) Rel-15 and the second type UE is a UE that belongs to a version later than Rel-15; or in response to the base station selecting S bits from the multiplexing DCI and defining a meaning of the S bits, acting, by the UE, according to the S bits, where S is less than Y; or in response to the base station dividing the P-RNTI into two types and defining meanings of the two types of P-RNTIs, acting, by the UE, according to a meaning of a first type of P-RNTI and a second type of P-RNTI.

Optionally, in response to the UE being the first type UE and being in version Rel-15 or in response to the UE being the first type UE and belonging to the version later than Rel-15, acting, by the UE, according to the B bits includes: in response to the first type UE detecting that the preset bits in the multiplexing DCI indicates the direct indication, discarding, by the first type UE, the B bits and detecting, by the first type UE, a corresponding PDSCH according to the Y bits; in response to the first type UE detecting that the preset bits in the multiplexing DCI indicates the paging and a B-bit state is a preset state, detecting, by the first type UE according to the Y bits or bits excluding a paging instruction bit field in the Y bits, a paging message sent in a scanning mode; and in response to the first type UE detecting that the preset bits in the multiplexing DCI indicates the paging and the B-bit state is a state excluding the preset state, discarding, by the first type UE, the multiplexing DCI, where the B-bit state corresponds to the B bits, the preset state is arbitrarily preselected from all states corresponding to the B bits to instruct the first type UE and the second type UE to detect the paging message sent in the scanning mode, and the paging instruction bit field includes at least one of a hybrid automatic repeat request (HARQ) process number bit field or a downlink allocation index bit field.

Optionally, in response to the UE being the second type UE and belonging to the version later than Rel-15, acting, by the UE, according to the B bits includes: in response to the second type UE detecting that the preset bits in the multiplexing DCI indicates the direct indication, discarding, by the second type UE, the B bits and detecting, by the second type UE, a corresponding PDSCH according to the Y bits; in response to the second type UE detecting that the preset bits in the multiplexing DCI indicates the paging and a B-bit state is a preset state, detecting, by the second type UE according to the Y bits or bits excluding a paging instruction bit field in the Y bits, a paging message sent in a scanning mode; and in response to the second type UE detecting that the preset bits in the multiplexing DCI indicates the paging and the B-bit state is a state excluding the preset state, switching, by the second type UE, to at least one of a corresponding non-scanning mode or a paging instruction according to the Y bits or the bits excluding the paging instruction bit field in the Y bits, where the paging instruction is a single paging instruction or a paging instruction set.

Optionally, in response to the UE being the first type UE and being in version Rel-15 or in response to the UE being the first type UE and belonging to the version later than Rel-15, acting, by the UE, according to the B bits includes: in response to the first type UE detecting that the preset bits in the multiplexing DCI indicates the direct indication, discarding, by the first type UE, the B bits and detecting, by the first type UE, a corresponding PDSCH according to the Y bits; and in response to the first type UE detecting that the preset bits in the multiplexing DCI indicates the paging, discarding, by the first type UE, the B bits and detecting, by the first type UE according to the Y bits or bits excluding a paging instruction bit field in the Y bits, a paging message sent in a scanning mode, where the paging instruction is a single paging instruction or a paging instruction set, and the paging instruction bit field includes at least one of a hybrid automatic repeat request (HARQ) process number bit field or a downlink allocation index bit field. Optionally, in response to the UE being the second type UE and belonging to the version later than Rel-15, acting, by the UE, according to the B bits includes: in response to the second type UE detecting that the preset bits in the multiplexing DCI indicates the direct indication, discarding, by the second type UE, the B bits and detecting, by the second type UE, a corresponding PDSCH according to the Y bits; and in response to the second type UE detecting that the preset bits in the multiplexing DCI indicates the paging, switching, by the second type UE, to at least one of a corresponding non-scanning mode or a paging instruction according to the Y bits or the bits excluding the paging instruction bit field in the Y bits, where the paging instruction is a single paging instruction or a paging instruction set.

Optionally, in response to the UE being the first type UE and being in version Rel-15 or in response to the UE being the first type UE and belonging to the version later than Rel-15, acting, by the UE, according to the S bits includes: in response to the first type UE detecting that the preset bits in the multiplexing DCI indicates the direct indication, detecting, by the first type UE, a corresponding PDSCH according to the Y bits; in response to the first type UE detecting that the preset bits in the multiplexing DCI indicates the paging and an S-bit state is a preset state, detecting, by the first type UE according to (Y-S) bits or bits excluding a paging instruction bit field in the (Y-S) bits, a paging message sent in a scanning mode; and in response to the first type UE detecting that the preset bits in the multiplexing DCI indicates the paging and the S-bit state is a state excluding the preset state, discarding, by the first type UE, the multiplexing DCI, where the S-bit state corresponds to the S bits, the preset state is arbitrarily preselected from all states corresponding to the S bits to instruct the first type UE and the second type UE to detect the paging message sent in the scanning mode, and the paging instruction bit field includes at least one of a hybrid automatic repeat request (HARQ) process number bit field or a downlink allocation index bit field.

Optionally, in response to the UE being the second type UE and belonging to the version later than Rel-15, acting, by the UE, according to the S bits includes: in response to the second type UE detecting that the preset bits in the multiplexing DCI indicates the direct indication, detecting, by the second type UE, a corresponding PDSCH according to the Y bits; in response to the second type UE detecting that the preset bits in the multiplexing DCI indicates the paging and an S-bit state is a preset state, detecting, by the second type UE according to (Y-S) bits or bits excluding a paging instruction bit field in the (Y-S) bits, a paging message sent in a scanning mode; and in response to the second type UE detecting that the preset bits in the multiplexing DCI indicates the paging and the S-bit state is a state excluding the preset state, switching, by the second type UE, to at least one of a corresponding non-scanning mode or a paging instruction according to the (Y-S) bits or the bits excluding the paging instruction bit field in the (Y-S) bits, where the paging instruction is a single paging instruction or a paging instruction set.

Optionally, in response to the UE being the first type UE and being in version Rel-15 or in response to the UE being the first type UE and belonging to the version later than Rel-15, acting, by the UE, according to the S bits includes: in response to the first type UE detecting that the preset bits in the multiplexing DCI indicates the direct indication, detecting, by the first type UE, a corresponding PDSCH according to the Y bits; and in response to the first type UE detecting that the preset bits in the multiplexing DCI indicates the paging, detecting, by the first type UE according to (Y-S) bits or bits excluding a paging instruction bit field in the (Y-S) bits, a paging message sent in a scanning mode, where an S-bit state corresponds to the S bits, the preset state is arbitrarily preselected from all states corresponding to the S bits to instruct the first type UE and the second type UE to detect the paging message sent in the scanning mode, and the paging instruction bit field includes at least one of a hybrid automatic repeat request (HARQ) process number bit field or a downlink allocation index bit field.

Optionally, in response to the UE being the second type UE and belonging to the version later than Rel-15, acting, by the UE, according to the S bits includes: in response to the second type UE detecting that the preset bits in the multiplexing DCI indicates the direct indication, detecting, by the second type UE, a corresponding PDSCH according to the Y bits; and in response to the second type UE detecting that the preset bits in the multiplexing DCI indicates the paging, switching, by the second type UE, to at least one of a corresponding non-scanning mode or a paging instruction according to (Y-S) bits or the bits excluding the paging instruction bit field in the (Y-S) bits, where the paging instruction is a single paging instruction or a paging instruction set.

Optionally, in response to the UE being the first type UE and being in version Rel-15 or in response to the UE being the first type UE and belonging to the version later than Rel-15, acting, by the UE, according to the meaning of the first type of P-RNTI and the meaning of the second type of P-RNTI includes: in response to the first type UE detecting that the multiplexing DCI is scrambled by the preset RNTI, detecting, by the first type UE, a corresponding PDSCH according to the Y bits; in response to the first type UE detecting that the multiplexing DCI is scrambled by the first type of P-RNTI, detecting, by the first type UE according to the Y bits or bits excluding a paging instruction bit field in the Y bits, a paging message sent in a scanning mode; and in response to the first type UE detecting that the multiplexing DCI is scrambled by the second type of P-RNTI, discarding, by the first type UE, the multiplexing DCI or discarding, by the first type UE, the multiplexing DCI after the multiplexing DCI is descrambled by the second type of P-RNTI.

Optionally, in response to the UE being the second type UE and belonging to the version later than Rel-15, acting, by the UE, according to the meaning of the first type of P-RNTI and the meaning of the second type of P-RNTI includes: in response to the second type UE detecting that the multiplexing DCI is scrambled by the preset RNTI, detecting, by the second type UE, a corresponding PDSCH according to the Y bits; in response to the second type UE detecting that the multiplexing DCI is scrambled by the first type of P-RNTI, detecting, by the second type UE according to the Y bits or bits excluding a paging instruction bit field in the Y bits, a paging message sent in a scanning mode; and in response to the second type UE detecting that the multiplexing DCI is scrambled by the second type of P-RNTI, switching, by the second type UE, to at least one of a corresponding non-scanning mode or a paging instruction according to the Y bits or the bits excluding the paging instruction bit field in the Y bits, where the paging instruction is a single paging instruction or a paging instruction set.

It is to be noted that the multiplexing DCI mentioned in this embodiment of the present disclosure multiplexes direct-indication DCI.

In the information transmission method provided in this embodiment of the present disclosure, instruction information is set in multiplexing DCI to instruct a UE that includes different types to act to switch a paging mechanism, thereby avoiding the massive congestion of service channels and excessive invalid uplink access processes and satisfying the requirements of network deployment and resource scheduling.

Figure 9:
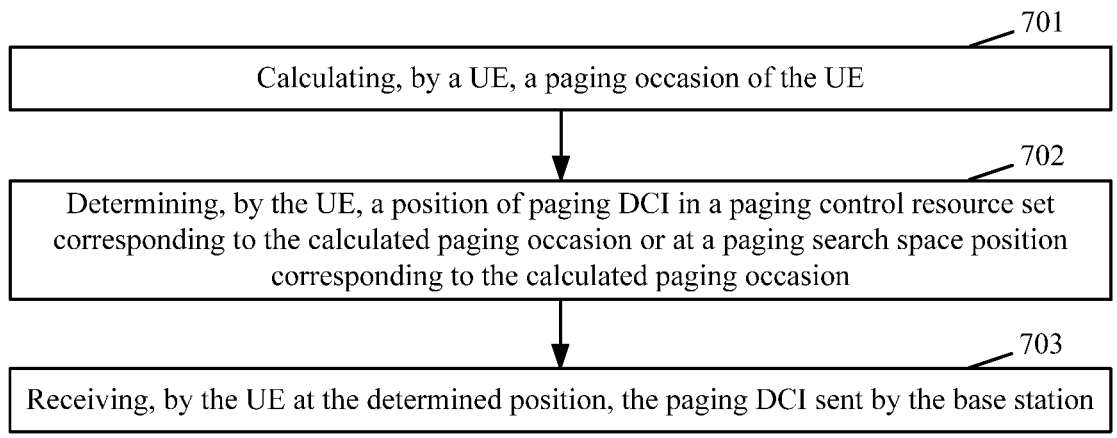
FIG. 9 is a flowchart of another information transmission method according to an embodiment of the present disclosure.

An embodiment of the present disclosure provides an information transmission method. As shown in FIG. 9, the method includes the steps 701, 702 and 703 below.

In step 701, a user equipment (UE) calculates a paging occasion of the UE.

In step 702, the UE determines a position of paging DCI in a paging control resource set corresponding to the calculated paging occasion or at a paging search space position corresponding to the calculated paging occasion.

In step 703, the UE receives, at the determined position, the paging DCI sent by the base station.

Optionally, calculating, by the UE, the paging occasion of the UE includes: in response to a discontinuous reception (DRX) cycle including P paging occasions in a time-domain direction, calculating, by the UE, the paging occasion of the UE by using UE_ID mod (P); and in response to the DRX cycle including N paging frames and each of the paging frames including P paging occasions in the time-domain direction, calculating, by the UE, the paging occasion of the UE by using floor (UE_ID/N) mod (P), where the UE_ID is an s-temporary mobile station identifier (S-TMSI) or an international mobile subscriber identity (IMSI) in a paging message, and the number of paging control resource sets or paging search spaces in a frequency-domain direction corresponding to the paging occasions in the time-domain direction is not greater than a number of bandwidth parts (BWPs).

Optionally, receiving, at the determined position by the UE, the paging DCI sent by the base station includes: detecting, on each of the paging control resource sets in the frequency-domain direction corresponding to the paging occasions in the time-domain direction or at each of the search space positions in the frequency-domain direction corresponding to the paging occasions in the time-domain direction by the UE, paging DCI corresponding to the paging occasions in the time-domain direction; and detecting, by the UE according to the paging DCI, the paging message at a resource position of the paging message.

Optionally, detecting, by the UE according to the paging DCI, the paging message at the resource position of the paging message includes: in response to the paging DCI including a time domain position indication field of the paging message, detecting, by the UE, the paging message on a time-domain resource corresponding to the time domain position indication field; in response to the paging DCI including a BWP index of the paging message, detecting, by the UE, the paging message on a BWP resource corresponding to the BWP index; and in response to the paging DCI including the time domain position indication field and the BWP index of the paging message, detecting, by the UE, the paging message on the time-domain resource corresponding to the time domain position indication field and the BWP resource corresponding to the BWP index.

Optionally, calculating, by the UE, the paging occasion of the UE includes: in response to a discontinuous reception (DRX) cycle including P paging occasions in a time-domain direction and Q paging occasions in a frequency-domain direction, calculating, by the UE, the paging occasion of the UE by using a first preset calculation method; and in response to the DRX cycle including N paging frames and each of the paging frames including P paging occasions in the time-domain direction and Q paging occasions in the frequency-domain direction, calculating, by the UE, the paging occasion of the UE by using a second preset calculation method, where the first preset calculation method includes any one of UE_ID mod (P*Q), UE_ID mod (P) mod (Q), or UE_ID mod (Q) mod (P) and the second preset calculation method includes any one of floor (UE_ID/N) mod (P*Q), floor (UE_ID/N) mod (P) mod (Q), or floor (UE_ID/N) mod (Q) mod (P), where the UE_ID is an s-temporary mobile station identifier (S-TMSI) or an international mobile subscriber identity (IMSI) in the paging message, the Q paging occasions in the frequency-domain direction correspond to Q paging control resource sets or paging search spaces, and Q is not greater than the number of bandwidth parts (BWPs).

Optionally, receiving, at the determined position by the UE, the paging DCI sent by the base station includes: detecting, in a paging control resource set of one of the paging occasions in the frequency-domain direction corresponding to the paging occasions in the time-domain direction or at a paging search space position of the one of the paging occasions in the frequency-domain direction corresponding to the paging occasions in the time-domain direction by the UE, paging DCI corresponding to the one of the paging occasions in the frequency-domain direction corresponding to the paging occasions in the time-domain direction; and detecting, by the UE according to the paging DCI, the paging message at a resource position of the paging message.

Optionally, detecting, by the UE according to the paging DCI, the paging message at the resource position of the paging message includes: in response to the paging DCI including a time domain position indication field of the paging message, detecting, by the UE, the paging message on a time-domain resource corresponding to the time domain position indication field; in response to the paging DCI including a BWP index of the paging message, detecting, by the UE, the paging message on a BWP resource corresponding to the BWP index; and in response to the paging DCI including the time domain position indication field and the BWP index of the paging message, detecting, by the UE, the paging message on the time-domain resource corresponding to the time domain position indication field and the BWP resource corresponding to the BWP index.

Optionally, the paging control resource sets and the paging search spaces are not allocated on a bandwidth part (BWP) indicated by a BWP index.

Optionally, in response to a synchronization signal block (SSB) is not existed on a BWP and at least one of the paging control resource set, an other system information (OSI) set or a remaining minimum system information (RMSI) set is configured on the BWP, the UE performs resource mapping of the configured set in a manner in which the SSB is existed, and a time-frequency resource configuration of the set is the same as a time-frequency resource configuration of an RMSI set on an initial access BWP, where a first resource block index of the SSB is detected and obtained by the UE or configured by the base station; or the time-frequency resource configuration of the set is the same as the time-frequency resource configuration of the RMSI set on the initial access BWP, where the first resource block index of the SSB is configured by the base station.

Optionally, in response to at least one of the paging control resource set, an other system information (OSI) set or a remaining minimum system information (RMSI) set is configured on the BWP, regardless of whether a synchronization signal block (SSB) is existed on the BWP, the UE performs resource mapping of the configured set in a manner in which the SSB is existed, and a time-frequency resource configuration of the set is the same as a time-frequency resource configuration of an RMSI set on an initial access BWP, where a first resource block index of the SSB is detected and obtained by the UE or configured by the base station; or the time-frequency resource configuration of the set is the same as the time-frequency resource configuration of the RMSI set on the initial access BWP, where the first resource block index of the SSB is configured by the base station.

In the information transmission method provided in this embodiment of the present disclosure, a paging occasion is calculated so that a base station can send paging DCI on different paging occasions, achieving dispersed paging DCI and avoiding time-frequency domain resource congestion.

Figure 10:
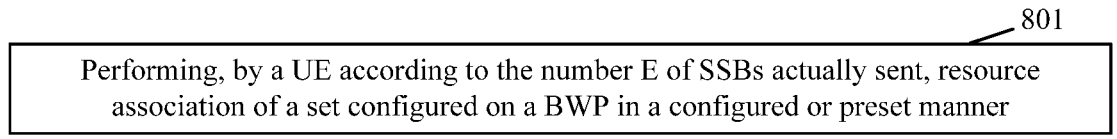
FIG. 10 is a flowchart of another information transmission method according to an embodiment of the present disclosure.

An embodiment of the present disclosure provides an information transmission method. As shown in FIG. 10, the method includes the steps below.

In step 801, a user equipment (UE) performs, according to the number E of synchronization signal blocks (SSBs) actually sent in a configured or preset manner, resource association of a set configured on a bandwidth part (BWP).

The configured set includes at least one of a paging control resource set or an other system information (OSI) set.

Optionally, performing, by the UE, the resource association of the set configured on the BWP according to the number E of SSBs actually sent in the configured or preset manner includes: adjusting, by the UE, associated SSB indexes according to the number E of SSBs actually sent in the configured or preset manner to obtain the adjusted associated SSB indexes i; and calculating, by the UE according to i, a first time slot index of the set configured on the BWP, where i=j+offset, j denotes logical indexes of the SSBs actually sent, j and the logical indexes of the SSBs actually sent are in one-to-one correspondence with each other in ascending order, a value range of j is {0, 1, 2, . . . , E−1}, and offset denotes the amount of offset.

Optionally, performing, by the UE according to the number E of SSBs actually sent, the resource association of the set configured on the BWP in the configured or preset manner includes: in response to the UE adjusting associated SSB indexes i according to the number E of SSBs actually sent in the preset manner, calculating, by the UE according to i, a first time slot index of the set configured on the BWP, where i are logical indexes j in one-to-one correspondence with the SSBs actually sent and a first position for sending an SSB is used as a starting position of the logical indexes j; or i are logical indexes j in one-to-one correspondence with the SSBs actually sent and a first position at which an SSB is actually sent is used as a starting position of the logical indexes j; or i are logical indexes j in one-to-one correspondence with the SSBs actually sent and an (F−E+1)th position for sending an SSB is used as a starting position of the logical indexes j, where a value range of j is {0, 1, 2, . . . , E−1}.

Optionally, performing, by the UE, the resource association of the set configured on the BWP according to the number E of SSBs actually sent in the configured or preset manner includes: adjusting, by the UE, associated SSB indexes according to the number E of SSBs actually sent in the configured manner.

Optionally, a search window of a configured resource set associated with the SSB indexes is a search window of a remaining minimum system information (RMSI) associated with the SSB indexes or is a search window excluding the search window of the RMSI associated with the SSB indexes.

In the information transmission method provided in this embodiment of the present disclosure, since an association is established between a paging control resource set and an SSB, unnecessary reserved resources are reduced.

Figure 11:
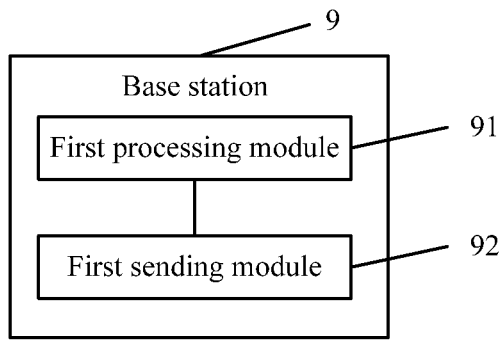
FIG. 11 is a structure diagram of a base station according to an embodiment of the present disclosure.

An embodiment of the present disclosure provides a base station. As shown in FIG. 11, the base station 9 includes a first processing module 91 configured to set, in multiplexing downlink control information (DCI), instruction information for instructing a user equipment (UE) that includes different types to act; and a first sending module 92 configured to send the multiplexing DCI to the UE.

The multiplexing DCI is DCI that multiplexes DCI of a physical downlink shared channel (PDSCH), and the multiplexing DCI is the DCI of the PDSCH in response to being scrambled by a preset radio network temporary identifier (RNTI) and is paging DCI in response to being scrambled by a paging radio network temporary identifier (P-RNTI), where the preset RNTI is an RNTI excluding the P-RNTI.

Optionally, the first processing module 91 is specifically configured to add A bits to the multiplexing DCI and define a meaning of the A bits for instructing the UE to act, where the multiplexing DCI includes X bits and the UE includes a first type UE and a second type UE, where the first type UE is a UE that belongs to 3rd Generation Partnership Project (3GPP) Rel-15 and the second type UE is a UE that belongs to a version later than Rel-15; or select R bits from the multiplexing DCI and define a meaning of the R bits for the purpose of instructing the UE to act, where R is less than X; or divide the P-RNTI into two types and define meanings of the two types of P-RNTIs for the purpose of instructing the first type UE and the second type UE to act.

Optionally, the first processing module 91 is further specifically configured to define that in response to the multiplexing DCI being scrambled by the preset RNTI, the meaning of an A-bit state is to instruct the first type UE and the second type UE to discard the A bits; define that in response to the multiplexing DCI being scrambled by the P-RNTI and the A-bit state being a preset state, the meaning of the A-bit state is to instruct the first type UE and the second type UE to detect a paging message sent in a scanning mode; and define that in response to the multiplexing DCI being scrambled by the P-RNTI and the A-bit state being a state excluding the preset state, the meaning of the A bits is to instruct the first type UE to discard the multiplexing DCI and instruct the second type UE to switch to at least one of a corresponding non-scanning mode or a paging instruction, where the paging instruction is a single paging instruction or a paging instruction set, and the preset state is randomly preselected from all states corresponding to the A bits and used for instructing the first type UE and the second type UE to detect the paging message sent in the scanning mode.

Optionally, the first processing module 91 is further specifically used for defining that in response to the multiplexing DCI being scrambled by the preset RNTI, the meaning of an A-bit state is to instruct the first type UE and the second type UE to discard the A bits; and defining that in response to the multiplexing DCI being scrambled by the P-RNTI, the meaning of the A-bit state is to instruct the first type UE to discard the A bits and detect a paging message sent in a scanning mode and instruct the second type UE to switch to at least one of a corresponding non-scanning mode or a paging instruction, where the paging instruction is a single paging instruction or a paging instruction set.

Optionally, the first processing module 91 is further specifically configured to define that in response to the multiplexing DCI being scrambled by the P-RNTI and an R-bit state being a preset state, the meaning of the R-bit state is to instruct the first type UE and the second type UE to detect a paging message sent in a scanning mode; and define that in response to the multiplexing DCI being scrambled by the P-RNTI and the R-bit state being a state excluding the preset state, the meaning of the R bits is to instruct the first type UE to discard the multiplexing DCI and instruct the second type UE to switch to at least one of a corresponding non-scanning mode or a paging instruction, where the paging instruction is a single paging instruction or a paging instruction set, and the preset state is randomly preselected from all states corresponding to the R bits and used for instructing the first type UE and the second type UE to detect the paging message sent in the scanning mode.

Optionally, the first processing module 91 is further specifically configured to define that in response to the multiplexing DCI being scrambled by the P-RNTI, the meaning of an R-bit state is to instruct the first type UE to detect a paging message sent in a scanning mode and instruct the second type UE to switch to at least one of a corresponding non-scanning mode or a paging instruction, where the paging instruction is a single paging instruction or a paging instruction set. Optionally, the first processing module 91 is further specifically configured to define that in response to the multiplexing DCI being scrambled by the first type of P-RNTI, the meaning of the first type of P-RNTI is to instruct the first type UE and the second type UE to detect a paging message sent in a scanning mode; and define that in response to the multiplexing DCI being scrambled by the second type of P-RNTI, the meaning of the second type of P-RNTI is to instruct the first type UE to discard the multiplexing DCI or instruct the first type UE to discard the multiplexing DCI after the multiplexing DCI is descrambled by the second type of P-RNTI and instruct the second type UE to switch to at least one of a corresponding non-scanning mode or a paging instruction, where the paging instruction is a single paging instruction or a paging instruction set.

It is to be noted that the multiplexing DCI mentioned in this embodiment of the present disclosure multiplexes DCI of a PSCDH.

As regards the base station provided in this embodiment of the present disclosure, instruction information is set in multiplexing DCI to instruct the UE that includes different types to act to switch a paging mechanism, avoiding the massive congestion of service channels and excessive invalid uplink access processes and satisfying the requirements of network deployment and resource scheduling.

In practical application, the first processing module 91 and the first sending module 92 may be both implemented by a central processing unit (CPU), a microprocessor unit (MPU), a digital signal processor (DSP) or a field-programmable gate array (FPGA) located in the base station 9.

Figure 12:
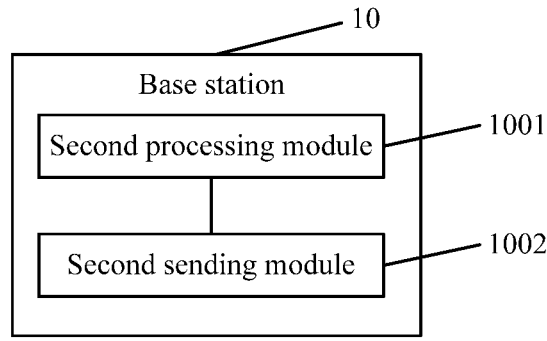
FIG. 12 is a structure diagram of another base station according to an embodiment of the present disclosure.

An embodiment of the present disclosure provides a base station. As shown in FIG. 12, the base station 10 includes a second processing module 1001 configured to set, in multiplexing downlink control information (DCI), instruction information for instructing a user equipment (UE) that includes different types to act; and a second sending module 1002 configured to send the multiplexing DCI to the UE.

The multiplexing DCI is DCI that multiplexes direct-indication DCI, and the multiplexing DCI is the direct-indication DCI in response to preset bits in the multiplexing DCI indicating a direct indication and is paging DCI in response to the preset bits in the multiplexing DCI indicating paging.

Optionally, the second processing module 1001 is specifically configured to add B bits to the multiplexing DCI and define a meaning of the B bits for instructing the UE to act, where the multiplexing DCI includes Y bits and the UE includes a first type UE and a second type UE, where the first type UE is a UE that belongs to 3rd Generation Partnership Project (3GPP) Rel-15 and the second type UE is a UE that belongs to a version later than Rel-15; or select S bits from the multiplexing DCI and define a meaning of the S bits for the purpose of instructing the UE to act, where S is less than Y; or divide the P-RNTI into two types and define meanings of the two types of P-RNTIs for the purpose of instructing the first type UE and the second type UE to act.

Optionally, the second processing module 1001 is further specifically configured to define that in response to the preset bits of the multiplexing DCI indicating the direct indication, the meaning of a B-bit state is to instruct the first type UE and the second type UE to discard the B bits; define that in response to the preset bits of the multiplexing DCI indicating the paging and the B-bit state being a preset state, the meaning of the B-bit state is to instruct the first type UE and the second type UE to detect a paging message sent in a scanning mode; and define that in response to the preset bits of the multiplexing DCI indicating the paging and the B-bit state being a state excluding the preset state, the meaning of the B bits is to instruct the first type UE to discard the multiplexing DCI and instruct the second type UE to switch to at least one of a corresponding non-scanning mode or a paging instruction, where the paging instruction is a single paging instruction or a paging instruction set, and the preset state is randomly preselected from all states corresponding to the B bits and used for instructing the first type UE and the second type UE to detect the paging message sent in the scanning mode.

Optionally, the second processing module 1001 is further specifically configured to define that in response to the preset bits of the multiplexing DCI indicating the direct indication, the meaning of a B-bit state is to instruct the first type UE and the second type UE to discard the B bits; and define that in response to the preset bits of the multiplexing DCI indicating the paging, the meaning of the B-bit state is to instruct the first type UE to discard the B bits and detect a paging message sent in a scanning mode and instruct the second type UE to switch to at least one of a corresponding non-scanning mode or a paging instruction, where the paging instruction is a single paging instruction or a paging instruction set.

Optionally, the second processing module 1001 is further specifically configured to define that in response to the preset bits of the multiplexing DCI indicating the paging and an S-bit state being a preset state, the meaning of the S-bit state is to instruct the first type UE and the second type UE to detect a paging message sent in a scanning mode; and define that in response to the preset bits of the multiplexing DCI indicating the paging and the S-bit state being a state excluding the preset state, the meaning of the S bits is to instruct the first type UE to discard the multiplexing DCI and instruct the second type UE to switch to at least one of a corresponding non-scanning mode or a paging instruction, where the paging instruction is a single paging instruction or a paging instruction set, and the preset state is randomly preselected from all states corresponding to the S bits and used for instructing the first type UE and the second type UE to detect the paging message sent in the scanning mode.

Optionally, the second processing module 1001 is further specifically configured to define that in response to the preset bits of the multiplexing DCI indicating the paging, the meaning of an S-bit state is to instruct the first type UE to detect a paging message sent in a scanning mode and instruct the second type UE to switch to at least one of a corresponding non-scanning mode or a paging instruction, where the paging instruction is a single paging instruction or a paging instruction set. Optionally, the second processing module 1001 is further specifically configured to define that in response to the multiplexing DCI being scrambled by the first type of P-RNTI, the meaning of the first type of P-RNTI is to instruct the first type UE and the second type UE to detect a paging message sent in a scanning mode; and define that in response to the multiplexing DCI being scrambled by the second type of P-RNTI, the meaning of the second type of P-RNTI is to instruct the first type UE to discard the multiplexing DCI or instruct the first type UE to discard the multiplexing DCI after the multiplexing DCI is descrambled by the second type of P-RNTI and instruct the second type UE to switch to at least one of a corresponding non-scanning mode or a paging instruction, where the paging instruction is a single paging instruction or a paging instruction set.

It is to be noted that the multiplexing DCI mentioned in this embodiment of the present disclosure multiplexes direct-indication DCI.

As regards the base station provided in this embodiment of the present disclosure, instruction information is set in multiplexing DCI to instruct the UE that includes different types to act to switch a paging mechanism, avoiding the massive congestion of service channels and excessive invalid uplink access processes and satisfying the requirements of network deployment and resource scheduling.

In practical application, the second processing module 1001 and the second sending module 1002 may be both implemented by a central processing unit (CPU), a microprocessor unit (MPU), a digital signal processor (DSP) or a field-programmable gate array (FPGA) located in the base station 10.

Figure 13:
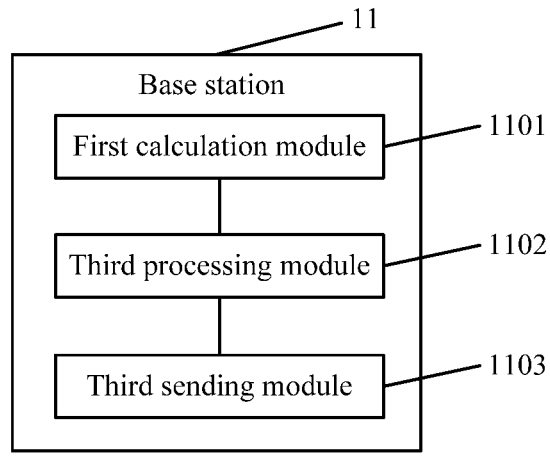
FIG. 13 is a structure diagram of another base station according to an embodiment of the present disclosure.

An embodiment of the present disclosure provides a base station. As shown in FIG. 13, the base station 11 includes a first calculation module 1101 configured to calculate a paging occasion of a user equipment (UE); a third processing module 1102 configured to determine a position of paging DCI in a paging control resource set corresponding to the calculated paging occasion or at a paging search space position corresponding to the calculated paging occasion; and a third sending module 1103 configured to send the paging DCI to the UE at the determined position. Optionally, the first calculation module 1101 is specifically configured to: in response to a discontinuous reception (DRX) cycle including P paging occasions in a time-domain direction, calculate the paging occasion of the UE by using UE_ID mod (P); and in response to the DRX cycle including N paging frames and each of the paging frames including P paging occasions in the time-domain direction, calculate the paging occasion of the UE by using floor (UE_ID/N) mod (P), where the UE_ID is an s-temporary mobile station identifier (S-TMSI) or an international mobile subscriber identity (IMSI) in a paging message, and the number of paging control resource sets or paging search spaces in a frequency-domain direction corresponding to the paging occasions in the time-domain direction is not greater than the number of bandwidth parts (BWPs).

Optionally, the third sending module 1103 is specifically configured to send, on each of the paging control resource sets in the frequency-domain direction corresponding to the paging occasions in the time-domain direction or at each of the search space positions in the frequency-domain direction corresponding to the paging occasions in the time-domain direction, paging DCI corresponding to all paged UEs on the paging occasions in the time-domain direction; and send, according to the paging DCI, the paging message at a resource position of the paging message.

Optionally, the third sending module 1103 is further specifically configured to: in response to the paging DCI including a time domain position indication field of the paging message, send the paging message on a time-domain resource corresponding to the time domain position indication field; in response to the paging DCI including a BWP index of the paging message, send the paging message on a BWP resource corresponding to the BWP index; and in response to the paging DCI including the time domain position indication field and the BWP index of the paging message, detect the paging message on the time-domain resource corresponding to the time domain position indication field and the BWP resource corresponding to the BWP index.

Optionally, the first calculation module 1101 is further specifically configured to: in response to a discontinuous reception (DRX) cycle including P paging occasions in a time-domain direction and Q paging occasions in a frequency-domain direction, calculate the paging occasion of the UE by using a first preset calculation method; and in response to the DRX cycle including N paging frames and each of the paging frames including P paging occasions in the time-domain direction and Q paging occasions in the frequency-domain direction, calculate the paging occasion of the UE by using a second preset calculation method, where the first preset calculation method includes any one of UE_ID mod (P*Q), UE_ID mod (P) mod (Q), or UE_ID mod (Q) mod (P) and the second preset calculation method includes any one of floor (UE_ID/N) mod (P*Q), floor (UE_ID/N) mod (P) mod (Q), or floor (UE_ID/N) mod (Q) mod (P), where the UE_ID is an s-temporary mobile station identifier (S-TMSI) or an international mobile subscriber identity (IMSI) in the paging message, the Q paging occasions in the frequency-domain direction correspond to Q paging control resource sets or paging search spaces, and Q is not greater than the number of bandwidth parts (BWPs).

Optionally, the third sending module 1103 is further specifically configured to send, in a paging control resource set of one of the paging occasions in the frequency-domain direction corresponding to the paging occasions in the time-domain direction or at a paging search space position of the one of the paging occasions in the frequency-domain direction corresponding to the paging occasions in the time-domain direction, paging DCI corresponding to all paged UEs on the one of the paging occasions in the frequency-domain direction corresponding to the paging occasions in the time-domain direction; and send, according to the paging DCI, the paging message at a resource position of the paging message.

Optionally, the third sending module 1103 is further specifically configured to: in response to the paging DCI including a time domain position indication field of the paging message, send the paging message on a time-domain resource corresponding to the time domain position indication field; in response to the paging DCI including a BWP index of the paging message, send the paging message on a BWP resource corresponding to the BWP index; and in response to the paging DCI including the time domain position indication field and the BWP index of the paging message, detect the paging message on the time-domain resource corresponding to the time domain position indication field and the BWP resource corresponding to the BWP index.

Optionally, the paging control resource sets and the paging search spaces are not allocated on a bandwidth part (BWP) indicated by a BWP index.

Optionally, the third processing module 1102 is further specifically configured to: in response to a synchronization signal block (SSB) is not existed on a BWP and at least one of the paging control resource set, an other system information (OSI) set or a remaining minimum system information (RMSI) set is configured on the BWP, perform resource mapping of the configured set in a manner in which the SSB is existed, and a time-frequency resource configuration of the set is the same as a time-frequency resource configuration of an RMSI set on an initial access BWP, where a first resource block index of the SSB is detected and obtained by the UE or configured by the base station. Alternatively, the time-frequency resource configuration of the set is the same as the time-frequency resource configuration of the RMSI set on the initial access BWP, where the first resource block index of the SSB is configured by the base station.

Optionally, the third processing module 1102 is further specifically configured to: in response to at least one of the paging control resource set, an other system information (OSI) set or a remaining minimum system information (RMSI) set is configured on the BWP, regardless of whether a synchronization signal block (SSB) is existed on the BWP, perform resource mapping of the configured set in a manner in which the SSB is existed, and a time-frequency resource configuration of the set is the same as a time-frequency resource configuration of an RMSI set on an initial access BWP, where a first resource block index of the SSB is detected and obtained by the UE or configured by the base station. Alternatively, the time-frequency resource configuration of the set is the same as the time-frequency resource configuration of the RMSI set on the initial access BWP, where the first resource block index of the SSB is configured by the base station.

As regards the base station provided in this embodiment of the present disclosure, a paging occasion is calculated so that the base station can send paging DCI on different paging occasions, achieving dispersed paging DCI and avoiding time-frequency domain resource congestion.

In practical application, the first calculation module 1101, the third processing module 1102 and the third sending module 1103 may be all implemented by a central processing unit (CPU), a microprocessor unit (MPU), a digital signal processor (DSP) or a field-programmable gate array (FPGA) located in the base station 11.

Figure 14:
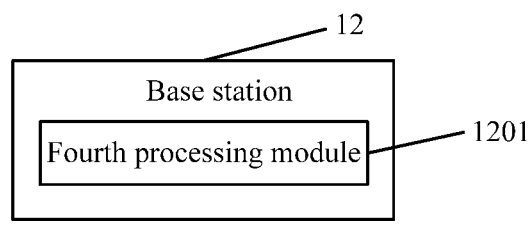
FIG. 14 is a structure diagram of another base station according to an embodiment of the present disclosure.

An embodiment of the present disclosure provides a base station. As shown in FIG. 14, the base station 12 includes a fourth processing module 1201 configured to perform, according to the number E of synchronization signal blocks (SSBs) actually sent in a configured or preset manner, resource association of a set configured on a bandwidth part (BWP).

The configured set includes at least one of a paging control resource set or an other system information (OSI) set.

Optionally, the fourth processing module 1201 is specifically configured to adjust associated SSB indexes according to the number E of SSBs actually sent in the configured or preset manner to obtain the adjusted associated SSB indexes i; and calculate, according to i, a first time slot index of the set configured on the BWP, where i=j+offset, j denotes logical indexes of the SSBs actually sent, j and the logical indexes of the SSBs actually sent are in one-to-one correspondence with each other in ascending order, a value range off is {0, 1, 2, . . . , E−1}, and offset denotes the amount of offset.

Optionally, the fourth processing module 1201 is further specifically configured to: in response to the base station adjusting associated SSB indexes i according to the number E of SSBs actually sent in the preset manner, calculate, according to i, a first time slot index of the set configured on the BWP, where i are logical indexes j in one-to-one correspondence with the SSBs actually sent and a first position for sending an SSB is used as a starting position of the logical indexes j; or i are logical indexes j in one-to-one correspondence with the SSBs actually sent and a first position at which an SSB is actually sent is used as a starting position of the logical indexes j; or i are logical indexes j in one-to-one correspondence with the SSBs actually sent and an (F−E+1)th position for sending an SSB is used as a starting position of the logical indexes j, where a value range off is {0, 1, 2, . . . , E−1}.

Optionally, the fourth processing module 1201 is further specifically configured to adjust associated SSB indexes according to the number E of SSBs actually sent in the configured manner. Optionally, a search window of a configured resource set associated with the SSB indexes is a search window of a remaining minimum system information (RMSI) associated with the SSB indexes or is a search window excluding the search window of the RMSI associated with the SSB indexes.

As regards the base station provided in this embodiment of the present disclosure, an association is established between a paging control resource set and an SSB, so unnecessary reserved resources are reduced.

In practical application, the fourth processing module 1201 may be implemented by a central processing unit (CPU), a microprocessor unit (MPU), a digital signal processor (DSP) or a field-programmable gate array (FPGA) located in the base station 12.

Figure 15:
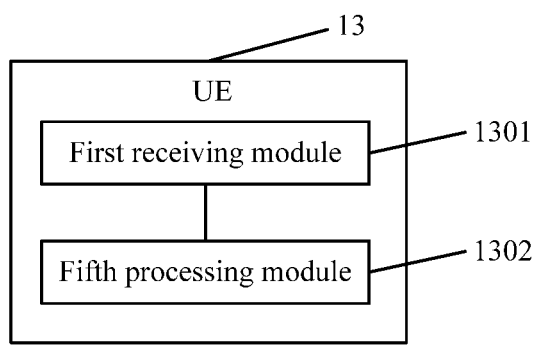
FIG. 15 is a structure diagram of a UE according to an embodiment of the present disclosure.

An embodiment of the present disclosure provides a user equipment (UE). As shown in FIG. 15, the UE 13 includes a first receiving module 1301 configured to receive multiplexing downlink control information (DCI) sent by a base station, where the multiplexing DCI is DCI that multiplexes DCI of a physical downlink shared channel (PDSCH) through the base station, and the multiplexing DCI is the DCI of the PDSCH in response to being scrambled by a preset radio network temporary identifier (RNTI) and is paging DCI in response to being scrambled by a paging radio network temporary identifier (P-RNTI), where the preset RNTI is an RNTI excluding the P-RNTI; and a fifth processing module 1302 configured to act according to instruction information configured in the multiplexing DCI.

Optionally, the fifth processing module 1302 is specifically configured to: in response to the base station adding A bits to the multiplexing DCI and defining a meaning of the A bits, act according to the A bits, where the multiplexing DCI includes X bits and the UE includes a first type UE and a second type UE, where the first type UE is a UE that belongs to 3rd Generation Partnership Project (3GPP) Rel-15 and the second type UE is a UE that belongs to a version later than Rel-15; or in response to the base station selecting R bits from the multiplexing DCI and defining a meaning of the R bits, act according to the R bits, where R is less than X; or in response to the base station dividing the P-RNTI into two types and defining meanings of the two types of P-RNTIs, act according to a meaning of a first type of P-RNTI and a meaning of a second type of P-RNTI.

Optionally, in response to the UE being the first type UE and being in version Rel-15 or in response to the UE being the first type UE and belonging to the version later than Rel-15, the fifth processing module 1302 is further specifically configured to: in response to the first type UE detecting that the multiplexing DCI is scrambled by the preset RNTI, discard the A bits and detect a corresponding PDSCH according to the X bits; in response to the first type UE detecting that the multiplexing DCI is scrambled by the P-RNTI and an A-bit state is a preset state, detect, according to the X bits or bits excluding a paging instruction bit field in the X bits, a paging message sent in a scanning mode; and in response to the first type UE detecting that the multiplexing DCI is scrambled by the P-RNTI and the A-bit state is a state excluding the preset state, discard the multiplexing DCI, where the A-bit state corresponds to the A bits, the preset state is arbitrarily preselected from all states corresponding to the A bits to instruct the first type UE and the second type UE to detect the paging message sent in the scanning mode, and the paging instruction bit field includes at least one of a hybrid automatic repeat request (HARQ) process number bit field or a downlink allocation index bit field.

Optionally, in response to the UE being the second type UE and belonging to the version later than Rel-15, the fifth processing module 1302 is further specifically configured to: in response to the second type UE detecting that the multiplexing DCI is scrambled by the preset RNTI, discard the A bits and detect a corresponding PDSCH according to the X bits; in response to the second type UE detecting that the multiplexing DCI is scrambled by the P-RNTI and an A-bit state is a preset state, detect, according to the X bits or bits excluding a paging instruction bit field in the X bits, a paging message sent in a scanning mode; and in response to the second type UE detecting that the multiplexing DCI is scrambled by the P-RNTI and the A-bit state is a state excluding the preset state, switch to at least one of a corresponding non-scanning mode or a paging instruction according to the X bits or the bits excluding the paging instruction bit field in the X bits, where the paging instruction is a single paging instruction or a paging instruction set.

Optionally, in response to the UE being the first type UE and being in version Rel-15 or in response to the UE being the first type UE and belonging to the version later than Rel-15, the fifth processing module 1302 is further specifically configured to: in response to the first type UE detecting that the multiplexing DCI is scrambled by the preset RNTI, discard the A bits and detect a corresponding PDSCH according to the X bits; and in response to the first type UE detecting that the multiplexing DCI is scrambled by the P-RNTI, discard the A bits and detect, according to the X bits or bits excluding a paging instruction bit field in the X bits, a paging message sent in a scanning mode, where the paging instruction is a single paging instruction or a paging instruction set, and the paging instruction bit field includes at least one of a hybrid automatic repeat request (HARQ) process number bit field or a downlink allocation index bit field.

Optionally, in response to the UE being the second type UE and belonging to the version later than Rel-15, the fifth processing module 1302 is further specifically configured to: in response to the second type UE detecting that the multiplexing DCI is scrambled by the preset RNTI, discard the A bits and detect a corresponding PDSCH according to the X bits; and in response to the second type UE detecting that the multiplexing DCI is scrambled by the P-RNTI, switch to at least one of a corresponding non-scanning mode or a paging instruction according to the X bits or the bits excluding the paging instruction bit field in the X bits, where the paging instruction is a single paging instruction or a paging instruction set.

Optionally, in response to the UE being the first type UE and being in version Rel-15 or in response to the UE being the first type UE and belonging to the version later than Rel-15, the fifth processing module 1302 is further specifically configured to: in response to the first type UE detecting that the multiplexing DCI is scrambled by the preset RNTI, detect a corresponding PDSCH according to the X bits; in response to the first type UE detecting that the multiplexing DCI is scrambled by the P-RNTI and an R-bit state is a preset state, detect, according to (X-R) bits or bits excluding a paging instruction bit field in the (X-R) bits, a paging message sent in a scanning mode; and in response to the first type UE detecting that the multiplexing DCI is scrambled by the P-RNTI and the R-bit state is a state excluding the preset state, discard the multiplexing DCI, where the R-bit state corresponds to the R bits, the preset state is arbitrarily preselected from all states corresponding to the R bits to instruct the first type UE and the second type UE to detect the paging message sent in the scanning mode, and the paging instruction bit field includes at least one of a hybrid automatic repeat request (HARQ) process number bit field or a downlink allocation index bit field.

Optionally, in response to the UE being the second type UE and belonging to the version later than Rel-15, the fifth processing module 1302 is further specifically configured to: in response to the second type UE detecting that the multiplexing DCI is scrambled by the preset RNTI, detect a corresponding PDSCH according to the X bits; in response to the second type UE detecting that the multiplexing DCI is scrambled by the P-RNTI and an R-bit state is a preset state, detect, according to (X-R) bits or bits excluding a paging instruction bit field in the (X-R) bits, a paging message sent in a scanning mode; and in response to the second type UE detecting that the multiplexing DCI is scrambled by the P-RNTI and the R-bit state is a state excluding the preset state, switch to at least one of a corresponding non-scanning mode or a paging instruction according to the (X-R) bits or the bits excluding the paging instruction bit field in the (X-R) bits, where the paging instruction is a single paging instruction or a paging instruction set.

Optionally, in response to the UE being the first type UE and being in version Rel-15 or in response to the UE being the first type UE and belonging to the version later than Rel-15, the fifth processing module 1302 is further specifically configured to: in response to the first type UE detecting that the multiplexing DCI is scrambled by the preset RNTI, detect a corresponding PDSCH according to the X bits; and in response to the first type UE detecting that the multiplexing DCI is scrambled by the P-RNTI, detect, according to (X-R) bits or bits excluding a paging instruction bit field in the (X-R) bits, a paging message sent in a scanning mode, where an R-bit state corresponds to the R bits, the preset state is arbitrarily preselected from all states corresponding to the R bits to instruct the first type UE and the second type UE to detect the paging message sent in the scanning mode, and the paging instruction bit field includes at least one of a hybrid automatic repeat request (HARQ) process number bit field or a downlink allocation index bit field.

Optionally, in response to the UE being the second type UE and belonging to the version later than Rel-15, the fifth processing module 1302 is further specifically configured to: in response to the second type UE detecting that the multiplexing DCI is scrambled by the preset RNTI, detect a corresponding PDSCH according to the X bits; and in response to the second type UE detecting that the multiplexing DCI is scrambled by the P-RNTI, switch to at least one of a corresponding non-scanning mode or a paging instruction according to the (X-R) bits or the bits excluding the paging instruction bit field in the (X-R) bits, where the paging instruction is a single paging instruction or a paging instruction set.

Optionally, in response to the UE being the first type UE and being in version Rel-15 or in response to the UE being the first type UE and belonging to the version later than Rel-15, the fifth processing module 1302 is further specifically configured to: in response to the first type UE detecting that the multiplexing DCI is scrambled by the preset RNTI, detect a corresponding PDSCH according to the X bits; in response to the first type UE detecting that the multiplexing DCI is scrambled by the first type of P-RNTI, detect, according to the X bits or bits excluding a paging instruction bit field in the X bits, a paging message sent in a scanning mode; and in response to the first type UE detecting that the multiplexing DCI is scrambled by the second type of P-RNTI, discard the multiplexing DCI or discard the multiplexing DCI after the multiplexing DCI is descrambled by the second type of P-RNTI.

Optionally, in response to the UE being the second type UE and belonging to the version later than Rel-15, the fifth processing module 1302 is further specifically configured to: in response to the second type UE detecting that the multiplexing DCI is scrambled by the preset RNTI, detect a corresponding PDSCH according to the X bits; in response to the second type UE detecting that the multiplexing DCI is scrambled by the first type of P-RNTI, detect, according to the X bits or bits excluding a paging instruction bit field in the X bits, a paging message sent in a scanning mode; and in response to the second type UE detecting that the multiplexing DCI is scrambled by the second type of P-RNTI, switch to at least one of a corresponding non-scanning mode or a paging instruction according to the X bits or the bits excluding the paging instruction bit field in the X bits, where the paging instruction is a single paging instruction or a paging instruction set. It is to be noted that the multiplexing DCI mentioned in this embodiment of the present disclosure multiplexes DCI of a PSCDH.

As regards the UE provided in this embodiment of the present disclosure, instruction information is set in multiplexing DCI to instruct the UE that includes different types to act to switch a paging mechanism, avoiding the massive congestion of service channels and excessive invalid uplink access processes and satisfying the requirements of network deployment and resource scheduling. In practical application, the first receiving module 1301 and the fifth processing module 1302 may be both implemented by a central processing unit (CPU), a microprocessor unit (MPU), a digital signal processor (DSP) or a field-programmable gate array (FPGA) located in the base station 13.

Figure 16:
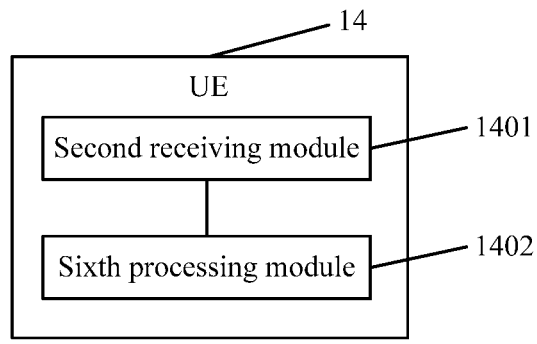
FIG. 16 is a structure diagram of another UE according to an embodiment of the present disclosure.

An embodiment of the present disclosure provides a user equipment (UE). As shown in FIG. 16, the UE 14 includes a second receiving module 1401 configured to receive multiplexing downlink control information (DCI) sent by a base station, where instruction information for instructing the UE that includes different types to act is set in the multiplexing DCI, the multiplexing DCI is DCI that multiplexes direct-indication DCI through the base station, and the multiplexing DCI is the direct-indication DCI in response to preset bits in the multiplexing DCI indicating a direct indication and is paging DCI in response to the preset bits in the multiplexing DCI indicating paging; and a sixth processing module 1402 configured to act according to the instruction information configured in the multiplexing DCI.

Optionally, the sixth processing module 1402 is specifically configured to: in response to the base station adding B bits to the multiplexing DCI and defining a meaning of the B bits, act according to the B bits, where the multiplexing DCI includes Y bits and the UE includes a first type UE and a second type UE, where the first type UE is a UE that belongs to 3rd Generation Partnership Project (3GPP) Rel-15 and the second type UE is a UE that belongs to a version later than Rel-15; or in response to the base station selecting S bits from the multiplexing DCI and defining a meaning of the S bits, act according to the S bits, where S is less than Y; or in response to the base station dividing the P-RNTI into two types and defining meanings of the two types of P-RNTIs, act according to a meaning of a first type of P-RNTI and a meaning of a second type of P-RNTI.

Optionally, in response to the UE being the first type UE and being in version Rel-15 or in response to the UE being the first type UE and belonging to the version later than Rel-15, the sixth processing module 1402 is further specifically configured to: in response to the first type UE detecting that the preset bits in the multiplexing DCI indicates the direct indication, discard the B bits and detect a corresponding PDSCH according to the Y bits; in response to the first type UE detecting that the preset bits in the multiplexing DCI indicates the paging and a B-bit state is a preset state, detect, according to the Y bits or bits excluding a paging instruction bit field in the Y bits, a paging message sent in a scanning mode; and in response to the first type UE detecting that the preset bits in the multiplexing DCI indicates the paging and the B-bit state is a state excluding the preset state, discard the multiplexing DCI, where the B-bit state corresponds to the B bits, the preset state is arbitrarily preselected from all states corresponding to the B bits to instruct the first type UE and the second type UE to detect the paging message sent in the scanning mode, and the paging instruction bit field includes at least one of a hybrid automatic repeat request (HARQ) process number bit field or a downlink allocation index bit field.

Optionally, in response to the UE being the second type UE and belonging to the version later than Rel-15, the sixth processing module 1402 is further specifically configured to: in response to the second type UE detecting that the preset bits in the multiplexing DCI indicates the direct indication, discard the B bits and detect a corresponding PDSCH according to the Y bits; in response to the second type UE detecting that the preset bits in the multiplexing DCI indicates the paging and a B-bit state is a preset state, detect, according to the Y bits or bits excluding a paging instruction bit field in the Y bits, a paging message sent in a scanning mode; and in response to the second type UE detecting that the preset bits in the multiplexing DCI indicates the paging and the B-bit state is a state excluding the preset state, switch to at least one of a corresponding non-scanning mode or a paging instruction according to the Y bits or the bits excluding the paging instruction bit field in the Y bits, where the paging instruction is a single paging instruction or a paging instruction set.

Optionally, in response to the UE being the first type UE and being in version Rel-15 or in response to the UE being the first type UE and belonging to the version later than Rel-15, the sixth processing module 1402 is further specifically configured to: in response to the first type UE detecting that the preset bits in the multiplexing DCI indicates the direct indication, discard the B bits and detect a corresponding PDSCH according to the Y bits; and in response to the first type UE detecting that the preset bits in the multiplexing DCI indicates the paging, discard the B bits and detect, according to the Y bits or bits excluding a paging instruction bit field in the Y bits, a paging message sent in a scanning mode, where the paging instruction is a single paging instruction or a paging instruction set, and the paging instruction bit field includes at least one of a hybrid automatic repeat request (HARQ) process number bit field or a downlink allocation index bit field.

Optionally, in response to the UE being the second type UE and belonging to the version later than Rel-15, the sixth processing module 1402 is further specifically configured to: in response to the second type UE detecting that the preset bits in the multiplexing DCI indicates the direct indication, discard the B bits and detect a corresponding PDSCH according to the Y bits; and in response to the second type UE detecting that the preset bits in the multiplexing DCI indicates the paging, switch to at least one of a corresponding non-scanning mode or a paging instruction according to the Y bits or the bits excluding the paging instruction bit field in the Y bits, where the paging instruction is a single paging instruction or a paging instruction set.

Optionally, in response to the UE being the first type UE and being in version Rel-15 or in response to the UE being the first type UE and belonging to the version later than Rel-15, the sixth processing module 1402 is further specifically configured to: in response to the first type UE detecting that the preset bits in the multiplexing DCI indicates the direct indication, discard the B bits and detect a corresponding PDSCH according to the Y bits; in response to the first type UE detecting that the preset bits in the multiplexing DCI indicates the paging and an S-bit state is a preset state, detect, according to the (Y-S) bits or bits excluding a paging instruction bit field in the (Y-S) bits, a paging message sent in a scanning mode; and in response to the first type UE detecting that the preset bits in the multiplexing DCI indicates the paging and the S-bit state is a state excluding the preset state, discard the multiplexing DCI, where the S-bit state corresponds to the S bits, the preset state is arbitrarily preselected from all states corresponding to the S bits to instruct the first type UE and the second type UE to detect the paging message sent in the scanning mode, and the paging instruction bit field includes at least one of a hybrid automatic repeat request (HARQ) process number bit field or a downlink allocation index bit field.

Optionally, in response to the UE being the second type UE and belonging to the version later than Rel-15, the sixth processing module 1402 is further specifically configured to: in response to the second type UE detecting that the preset bits in the multiplexing DCI indicates the direct indication, detect a corresponding PDSCH according to the Y bits; in response to the second type UE detecting that the preset bits in the multiplexing DCI indicates the paging and an S-bit state is a preset state, detect, according to (Y-S) bits or bits excluding a paging instruction bit field in the (Y-S) bits, a paging message sent in a scanning mode; and in response to the second type UE detecting that the preset bits in the multiplexing DCI indicates the paging and the S-bit state is a state excluding the preset state, switch to at least one of a corresponding non-scanning mode or a paging instruction according to the (Y-S) bits or the bits excluding the paging instruction bit field in the (Y-S) bits, where the paging instruction is a single paging instruction or a paging instruction set.

Optionally, in response to the UE being the first type UE and being in version Rel-15 or in response to the UE being the first type UE and belonging to the version later than Rel-15, the sixth processing module 1402 is further specifically configured to: in response to the first type UE detecting that the preset bits in the multiplexing DCI indicates the direct indication, detect a corresponding PDSCH according to the Y bits; and in response to the first type UE detecting that the preset bits in the multiplexing DCI indicates the paging, detect, according to (Y-S) bits or bits excluding a paging instruction bit field in the (Y-S) bits, a paging message sent in a scanning mode, where an S-bit state corresponds to the S bits, the preset state is arbitrarily preselected from all states corresponding to the S bits to instruct the first type UE and the second type UE to detect the paging message sent in the scanning mode, and the paging instruction bit field includes at least one of a hybrid automatic repeat request (HARQ) process number bit field or a downlink allocation index bit field.

Optionally, in response to the UE being the second type UE and belonging to the version later than Rel-15, the sixth processing module 1402 is further specifically configured to: in response to the second type UE detecting that the preset bits in the multiplexing DCI indicates the direct indication, detect a corresponding PDSCH according to the Y bits; and in response to the second type UE detecting that the preset bits in the multiplexing DCI indicates the paging, switch to at least one of a corresponding non-scanning mode or a paging instruction according to the (Y-S) bits or the bits excluding the paging instruction bit field in the (Y-S) bits, where the paging instruction is a single paging instruction or a paging instruction set.

Optionally, in response to the UE being the first type UE and being in version Rel-15 or in response to the UE being the first type UE and belonging to the version later than Rel-15, the sixth processing module 1402 is further specifically configured to: in response to the first type UE detecting that the multiplexing DCI is scrambled by the preset RNTI, detect a corresponding PDSCH according to the Y bits; in response to the first type UE detecting that the multiplexing DCI is scrambled by the first type of P-RNTI, detect, according to the Y bits or bits excluding a paging instruction bit field in the Y bits, a paging message sent in a scanning mode; and in response to the first type UE detecting that the multiplexing DCI is scrambled by the second type of P-RNTI, discard the multiplexing DCI or discard the multiplexing DCI after the multiplexing DCI is descrambled by the second type of P-RNTI.

Optionally, in response to the UE being the second type UE and belonging to the version later than Rel-15, the sixth processing module 1402 is further specifically configured to: in response to the second type UE detecting that the multiplexing DCI is scrambled by the preset RNTI, detect a corresponding PDSCH according to the Y bits; in response to the second type UE detecting that the multiplexing DCI is scrambled by the first type of P-RNTI, detect, according to the Y bits or bits excluding a paging instruction bit field in the Y bits, a paging message sent in a scanning mode; and in response to the second type UE detecting that the multiplexing DCI is scrambled by the second type of P-RNTI, switch to at least one of a corresponding non-scanning mode or a paging instruction according to the Y bits or the bits excluding the paging instruction bit field in the Y bits, where the paging instruction is a single paging instruction or a paging instruction set. It is to be noted that the multiplexing DCI mentioned in this embodiment of the present disclosure multiplexes direct-indication DCI.

Figure 17:
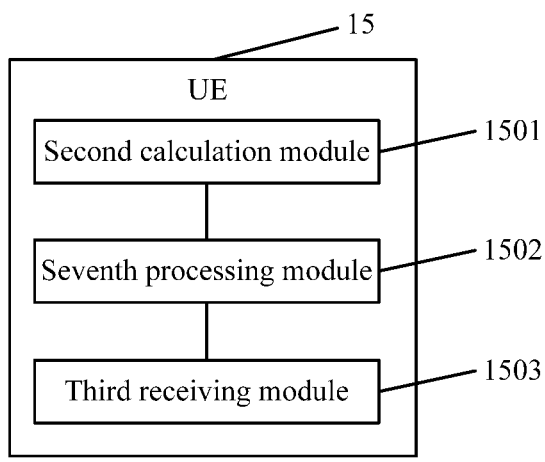
FIG. 17 is a structure diagram of another UE according to an embodiment of the present disclosure.

As regards the UE provided in this embodiment of the present disclosure, instruction information is set in multiplexing DCI to instruct the UE that includes different types to act to switch a paging mechanism, avoiding the massive congestion of service channels and excessive invalid uplink access processes and satisfying the requirements of network deployment and resource scheduling. In practical application, the second receiving module 1401 and the sixth processing module 1402 may be both implemented by a central processing unit (CPU), a microprocessor unit (MPU), a digital signal processor (DSP) or a field-programmable gate array (FPGA) located in the UE 14. An embodiment of the present disclosure provides a user equipment (UE). As shown in FIG. 17, the UE 15 includes a second calculation module 1501 configured to calculate a paging occasion of the UE; a seventh processing module 1502 configured to determine a position of paging DCI in a paging control resource set corresponding to the calculated paging occasion or at a paging search space position corresponding to the calculated paging occasion; and a third receiving module 1503 configured to receive, at the determined position, the paging DCI sent by the base station.

Optionally, the second calculation module 1501 is specifically configured to: in response to a discontinuous reception (DRX) cycle including P paging occasions in a time-domain direction, calculate the paging occasion of the UE by using UE_ID mod (P); and in response to the DRX cycle including N paging frames and each of the paging frames including P paging occasions in the time-domain direction, calculate the paging occasion of the UE by using floor (UE_ID/N) mod (P), where the UE_ID is an s-temporary mobile station identifier (S-TMSI) or an international mobile subscriber identity (IMSI) in a paging message, and the number of paging control resource sets or paging search spaces in a frequency-domain direction corresponding to the paging occasions in the time-domain direction is not greater than the number of bandwidth parts (BWPs).

Optionally, the third receiving module 1503 is specifically configured to detect, on each of the paging control resource sets in the frequency-domain direction corresponding to the paging occasions in the time-domain direction or at each of the search space positions in the frequency-domain direction corresponding to the paging occasions in the time-domain direction, paging DCI corresponding to the paging occasions in the time-domain direction; and detect, according to the paging DCI, the paging message at a resource position of the paging message.

Optionally, the third receiving module 1503 is further specifically configured to: in response to the paging DCI including a time domain position indication field of the paging message, detect the paging message on a time-domain resource corresponding to the time domain position indication field; in response to the paging DCI including a BWP index of the paging message, detect the paging message on a BWP resource corresponding to the BWP index; and in response to the paging DCI including the time domain position indication field and the BWP index of the paging message, detect the paging message on the time-domain resource corresponding to the time domain position indication field and the BWP resource corresponding to the BWP index.

Optionally, the second calculation module 1501 is further specifically configured to: in response to a discontinuous reception (DRX) cycle including P paging occasions in a time-domain direction and Q paging occasions in a frequency-domain direction, calculate the paging occasion of the UE by using a first preset calculation method; and in response to the DRX cycle including N paging frames and each of the paging frames including P paging occasions in the time-domain direction and Q paging occasions in the frequency-domain direction, calculate the paging occasion of the UE by using a second preset calculation method, where the first preset calculation method includes any one of UE_ID mod (P*Q), UE_ID mod (P) mod (Q), or UE_ID mod (Q) mod (P) and the second preset calculation method includes any one of floor (UE_ID/N) mod (P*Q), floor (UE_ID/N) mod (P) mod (Q), or floor (UE_ID/N) mod (Q) mod (P), where the UE_ID is an s-temporary mobile station identifier (S-TMSI) or an international mobile subscriber identity (IMSI) in the paging message, the Q paging occasions in the frequency-domain direction correspond to Q paging control resource sets or paging search spaces, and Q is not greater than the number of bandwidth parts (BWPs).

Optionally, the third receiving module 1503 is further specifically configured to detect, in a paging control resource set of one of the paging occasions in the frequency-domain direction corresponding to the paging occasions in the time-domain direction or at a paging search space position of the one of the paging occasions in the frequency-domain direction corresponding to the paging occasions in the time-domain direction, paging DCI corresponding to the one of the paging occasions in the frequency-domain direction corresponding to the paging occasions in the time-domain direction; and detect, according to the paging DCI, the paging message at a resource position of the paging message.

Optionally, the third receiving module 1503 is further specifically configured to: in response to the paging DCI including a time domain position indication field of the paging message, detect the paging message on a time-domain resource corresponding to the time domain position indication field; in response to the paging DCI including a BWP index of the paging message, detect the paging message on a BWP resource corresponding to the BWP index; and in response to the paging DCI including the time domain position indication field and the BWP index of the paging message, detect the paging message on the time-domain resource corresponding to the time domain position indication field and the BWP resource corresponding to the BWP index.

Optionally, the paging control resource sets and the paging search spaces are not allocated on a bandwidth part (BWP) indicated by a BWP index.

Optionally, the seventh processing module 1502 is further specifically configured to: in response to a synchronization signal block (SSB) is not existed on a BWP and at least one of the paging control resource set, an other system information (OSI) set or a remaining minimum system information (RMSI) set is configured on the BWP, perform resource mapping of the configured set in a manner in which the SSB is existed, and a time-frequency resource configuration of the set is the same as a time-frequency resource configuration of an RMSI set on an initial access BWP, where a first resource block index of the SSB is detected and obtained by the UE or configured by the base station. Alternatively, the time-frequency resource configuration of the set is the same as the time-frequency resource configuration of the RMSI set on the initial access BWP, where the first resource block index of the SSB is configured by the base station.

Optionally, the seventh processing module 1502 is further specifically configured to: in response to at least one of the paging control resource set, an other system information (OSI) set or a remaining minimum system information (RMSI) set is configured on the BWP, regardless of whether a synchronization signal block (SSB) is existed on the BWP, perform resource mapping of the configured set in a manner in which the SSB is existed, and a time-frequency resource configuration of the set is the same as a time-frequency resource configuration of an RMSI set on an initial access BWP, where a first resource block index of the SSB is detected and obtained by the UE or configured by the base station. Alternatively, the time-frequency resource configuration of the set is the same as the time-frequency resource configuration of the RMSI set on the initial access BWP, where the first resource block index of the SSB is configured by the base station.

As regards the UE provided in this embodiment of the present disclosure, a paging occasion is calculated so that the base station can send paging DCI on different paging occasions, achieving dispersed paging DCI and avoiding time-frequency domain resource congestion.

In practical application, the second calculation module 1501, the seventh processing module 1502 and the third receiving module 1503 may be all implemented by a central processing unit (CPU), a microprocessor unit (MPU), a digital signal processor (DSP) or a field-programmable gate array (FPGA) located in the base station 15.

Figure 18:
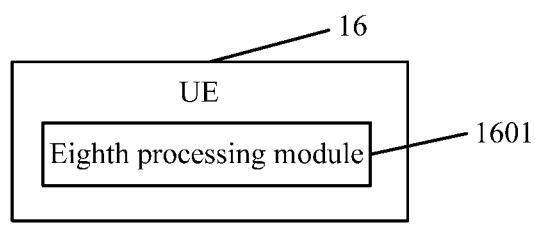
FIG. 18 is a structure diagram of another UE according to an embodiment of the present disclosure.

An embodiment of the present disclosure provides a user equipment (UE). As shown in FIG. 18, the UE 16 includes an eighth processing module 1601 configured to perform, according to the number E of synchronization signal blocks (SSBs) actually sent in a configured or preset manner, resource association of a set configured on a bandwidth part (BWP).

The configured set includes at least one of a paging control resource set or an other system information (OSI) set.

Optionally, the eighth processing module 1601 is specifically configured to adjust associated SSB indexes according to the number E of SSBs actually sent in the configured or preset manner to obtain the adjusted associated SSB indexes i; and calculate, according to i, a first time slot index of the set configured on the BWP, where i=j+offset, j denotes logical indexes of the SSBs actually sent, j and the logical indexes of the SSBs actually sent are in one-to-one correspondence with each other in ascending order, a value range of j is {0, 1, 2, . . . , E−1}, and offset denotes the amount of offset.

Optionally, the eighth processing module 1601 is further specifically configured to: in response to the UE adjusting associated SSB indexes i according to the number E of SSBs actually sent in the preset manner, calculate, according to i, a first time slot index of the set configured on the BWP, where i are logical indexes j in one-to-one correspondence with the SSBs actually sent and a first position for sending an SSB is used as a starting position of the logical indexes j; or i are logical indexes j in one-to-one correspondence with the SSBs actually sent and a first position at which an SSB is actually sent is used as a starting position of the logical indexes j; or i are logical indexes j in one-to-one correspondence with the SSBs actually sent and an (F−E+1)th position for sending an SSB is used as a starting position of the logical indexes j, where a value range of j is {0, 1, 2, . . . , E−1}.

Optionally, the eighth processing module 1601 is further specifically configured to adjust associated SSB indexes according to the number E of SSBs actually sent in the configured manner. Optionally, a search window of a configured resource set associated with the SSB indexes is a search window of a remaining minimum system information (RMSI) associated with the SSB indexes or is a search window excluding the search window of the RMSI associated with the SSB indexes.

As regards the UE provided in this embodiment of the present disclosure, an association is established between a paging control resource set and an SSB, so unnecessary reserved resources are reduced.

In practical application, the eighth processing module 1601 may be implemented by a central processing unit (CPU), a microprocessor unit (MPU), a digital signal processor (DSP) or a field-programmable gate array (FPGA) located in the UE 16.

Although the embodiments disclosed by the present disclosure are as described above, the content of the embodiments is intended only to facilitate the understanding of the present disclosure and not to limit the present disclosure. Any person skilled in the art to which the present disclosure pertains may make any modifications and changes in the form and details of implementation without departing from the spirit and scope disclosed by the present disclosure, but the scope of the present patent is still subject to the scope defined by the appended claims.

What is claimed is:

1. An information transmission method, comprising:
   calculating, by a base station, a paging occasion of a user equipment (UE);
   determining, by the base station, a position of paging DCI in a paging control resource set corresponding to the calculated paging occasion or at a paging search space position corresponding to the calculated paging occasion; and
   sending, by the base station, the paging DCI to the UE at the determined position;
   wherein the calculating, by the base station, the paging occasion of the UE comprises:
   in response to a discontinuous reception (DRX) cycle comprising P paging occasions in a time-domain direction, calculating, by the base station, the paging occasion of the UE by using UE_ID mod (P); and in response to the DRX cycle comprising N paging frames and each of the paging frames comprising P paging occasions in the time-domain direction, calculating, by the base station, the paging occasion of the UE by using floor (UE_ID/N) mod (P), wherein the UE_ID is an s-temporary mobile station identifier (S-TMSI) or an international mobile subscriber identity (IMSI) in a paging message.

2. The information transmission method of claim 1, wherein the sending, by the base station, the paging DCI to the UE at the determined position comprises:
   sending, on each of the paging control resource sets in the frequency-domain direction corresponding to the paging occasions in the time-domain direction or at each of the search space positions in the frequency-domain direction corresponding to the paging occasions in the time-domain direction by the base station, paging DCI corresponding to all paged UEs on the paging occasions in the time-domain direction; and
   sending, by the base station according to the paging DCI, the paging message at a resource position of the paging message.

3. The information transmission method of claim 2, wherein the sending, by the base station according to the paging DCI, the paging message at the resource position of the paging message comprises:
   in response to the paging DCI comprising a time domain position indication field of the paging message, sending, by the base station, the paging message on a time-domain resource corresponding to the time domain position indication field; in response to the paging DCI comprising a BWP index of the paging message, sending, by the base station, the paging message on a BWP resource corresponding to the BWP index; and in response to the paging DCI comprising the time domain position indication field and the BWP index of the paging message, sending, by the base station, the paging message on the time-domain resource corresponding to the time domain position indication field and the BWP resource corresponding to the BWP index.

4. The information transmission method of claim 1, wherein in condition that at least one of the paging control resource set, an other system information (OSI) set or a remaining minimum system information (RMSI) set is configured on the BWP, regardless of whether a synchronization signal block (SSB) is existed on the BWP, performing, by the base station, resource mapping of the configured set in a manner in which the SSB is existed, and a time-frequency resource configuration of the set is the same as a time-frequency resource configuration of an RMSI set on an initial access BWP, wherein a first resource block index of the SSB is detected and obtained by the UE or configured by the base station; or the time-frequency resource configuration of the set is the same as the time-frequency resource configuration of the RMSI set on the initial access BWP, wherein the first resource block index of the SSB is configured by the base station.

5. The information transmission method of claim 1, further comprising:
performing, by a base station according to a number E of synchronization signal blocks (SSBs) actually sent, resource association of a set or a search space configured on a bandwidth part (BWP) in a configured or preset manner, wherein the configured set comprises at least one of a paging control resource set or an other system information (OSI) set, and the search space comprises at least one of a paging search space or an OSI search space.

6. The information transmission method of claim 5, wherein the performing, by the base station according to the number E of the SSBs actually sent, the resource association of the set configured on the BWP in the configured or preset manner comprises:
adjusting, by the base station according to the number E of the SSBs actually sent, associated SSB indexes in the configured or preset manner to obtain the adjusted associated SSB indexes i; and
calculating, by the base station according to i, a first time slot index of the set configured on the BWP, wherein i=j+offset, j denotes logical indexes of the SSBs actually sent, j and the logical indexes of the SSBs actually sent are in one-to-one correspondence with each other in ascending order, a value range of j is {0, 1, 2, . . . , E−1}, and offset denotes an amount of offset.

7. The information transmission method of claim 1, in condition that paging control resource sets and the paging search spaces are not allocated on a bandwidth part (BWP), not transmitting a physical downlink control channel (PDCCH).

8. An information transmission method, comprising:
calculating, by a user equipment (UE), a paging occasion of the UE;
determining, by the UE, a position of paging DCI in a paging control resource set corresponding to the calculated paging occasion or at a paging search space position corresponding to the calculated paging occasion; and
receiving, at the determined position by the UE, the paging DCI sent by the base station;
wherein the calculating, by the UE, the paging occasion of the UE comprises:
in response to a discontinuous reception (DRX) cycle comprising P paging occasions in a time-domain direction, calculating, by the UE, the paging occasion of the UE by using UE_ID mod (P); and in response to the DRX cycle comprising N paging frames and each of the paging frames comprising P paging occasions in the time-domain direction, calculating, by the UE, the paging occasion of the UE by using floor (UE_ID/N) mod (P), wherein the UE_ID is an s-temporary mobile station identifier (S-TMSI) or an international mobile subscriber identity (IMSI) in a paging message.

9. The information transmission method of claim 8, wherein the receiving, at the determined position by the UE, the paging DCI sent by the base station comprises:
detecting, on each of the paging control resource sets in the frequency-domain direction corresponding to the paging occasions in the time-domain direction or at each of the search space positions in the frequency-domain direction corresponding to the paging occasions in the time-domain direction by the UE, paging DCI corresponding to the paging occasions in the time-domain direction; and
detecting, by the UE according to the paging DCI, the paging message at a resource position of the paging message.

10. The information transmission method of claim 9, wherein the detecting, by the UE according to the paging DCI, the paging message at the resource position of the paging message comprises:
in response to the paging DCI comprising a time domain position indication field of the paging message, detecting, by the UE, the paging message on a time-domain resource corresponding to the time domain position indication field; in response to the paging DCI comprising a BWP index of the paging message, detecting, by the UE, the paging message on a BWP resource corresponding to the BWP index; and in response to the paging DCI comprising the time domain position indication field and the BWP index of the paging message, sending, by the UE, the paging message on the time-domain resource corresponding to the time domain position indication field and the BWP resource corresponding to the BWP index.

11. The information transmission method of claim 8, wherein in condition that at least one of the paging control resource set, an other system information (OSI) set or a remaining minimum system information (RMSI) set is configured on the BWP, regardless of whether a synchronization signal block (SSB) is existed on the BWP, the UE performs resource mapping of the configured set in a manner in which the SSB is existed, and a time-frequency resource configuration of the set is the same as a time-frequency resource configuration of an RMSI set on an initial access BWP, wherein a first resource block index of the SSB is detected and obtained by the UE or configured by the base station; or the time-frequency resource configuration of the set is the same as the time-frequency resource configuration of the RMSI set on the initial access BWP, wherein the first resource block index of the SSB is configured by the base station.

12. The information transmission method of claim 8, comprising:
performing, by a user equipment (UE) according to a number E of synchronization signal blocks (SSBs) actually sent, resource association of a set or a search space configured on a bandwidth part (BWP) in a configured or preset manner, wherein the configured set comprises at least one of a paging control resource set or an other system information (OSI) set, and the search space comprises at least one of a paging search space or an OSI search space.

13. The information transmission method of claim 12, wherein the performing, by the UE according to the number E of SSBs actually sent, the resource association of the set configured on the BWP in the configured or preset manner comprises:

adjusting, by the UE according to the number E of SSBs actually sent, associated SSB indexes in the configured or preset manner to obtain the adjusted associated SSB indexes i; and calculating, by the UE according to i, a first time slot index of the set configured on the BWP, wherein i=j+offset, j denotes logical indexes of the SSBs actually sent, j and the logical indexes of the SSBs actually sent are in one-to-one correspondence with each other in ascending order, a value range of j is {0, 1, 2, . . . , E−1}, and offset denotes an amount of offset.

14. The information transmission method of claim 8, in condition that paging control resource sets and the paging search spaces are not allocated on a bandwidth part (BWP), not transmitting a physical downlink control channel (PDCCH).

15. A user equipment (UE), comprising:
at least one processor; and
a memory for storing instructions executable by the at least one processor, wherein the at least one processor is configured to perform:
calculating, by a base station, a paging occasion of a user equipment (UE);
determining, by the base station, a position of paging DCI in a paging control resource set corresponding to the calculated paging occasion or at a paging search space position corresponding to the calculated paging occasion; and
sending, by the base station, the paging DCI to the UE at the determined position;
wherein the calculating, by the base station, the paging occasion of the UE comprises:
in response to a discontinuous reception (DRX) cycle comprising P paging occasions in a time-domain direction, calculating, by the base station, the paging occasion of the UE by using UE_ID mod (P); and in response to the DRX cycle comprising N paging frames and each of the paging frames comprising P paging occasions in the time-domain direction, calculating, by the base station, the paging occasion of the UE by using floor (UE_ID/N) mod (P), wherein the UE_ID is an s-temporary mobile station identifier (S-TMSI) or an international mobile subscriber identity (IMSI) in a paging message.

* * * * *